United States Patent
Kaneko et al.

(10) Patent No.: US 7,113,244 B2
(45) Date of Patent: *Sep. 26, 2006

(54) LIQUID CRYSTAL DISPLAY

(75) Inventors: Toshiki Kaneko, Tokyo (JP); Kazumi Fujii, Tokyo (JP); Kikuo Ono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/139,164

(22) Filed: May 26, 2005

(65) Prior Publication Data

US 2005/0206825 A1    Sep. 22, 2005

Related U.S. Application Data

(63) Continuation of application No. 10/936,021, filed on Sep. 7, 2004, now Pat. No. 6,903,793, which is a continuation of application No. 09/754,232, filed on Jan. 3, 2001, now Pat. No. 6,912,035.

(30) Foreign Application Priority Data

Jan. 7, 2000    (JP)    .................. 2000-5856

(51) Int. Cl.
*G02F 1/1343*    (2006.01)
*G02F 1/136*    (2006.01)

(52) U.S. Cl. ........................ 349/147; 349/43

(58) Field of Classification Search ............ 349/42–43, 349/141–143, 147

See application file for complete search history.

(56) References Cited

U.S. PATENT DOCUMENTS

| 6,341,003 B1 * | 1/2002 | Ashizawa et al. ......... 349/141 |
| 6,903,793 B1 * | 6/2005 | Kaneko et al. ............. 349/141 |
| 6,912,035 B1 * | 6/2005 | Kaneko et al. ............. 349/147 |

* cited by examiner

*Primary Examiner*—Dung T. Nguyen
(74) *Attorney, Agent, or Firm*—Townsend and Townsend and Crew LLP

(57) ABSTRACT

An interconnecting structure and a pixel structure suited to large-sized screens are formed. A counter line/electrode is formed on a TFT substrate, and the counter line/electrode is made of a stacked structure film in which a layer made of aluminum or an alloy essentially containing aluminum is covered with a high-melting point metal film, and a transparent conductive film which covers the stacked structure film.

13 Claims, 21 Drawing Sheets

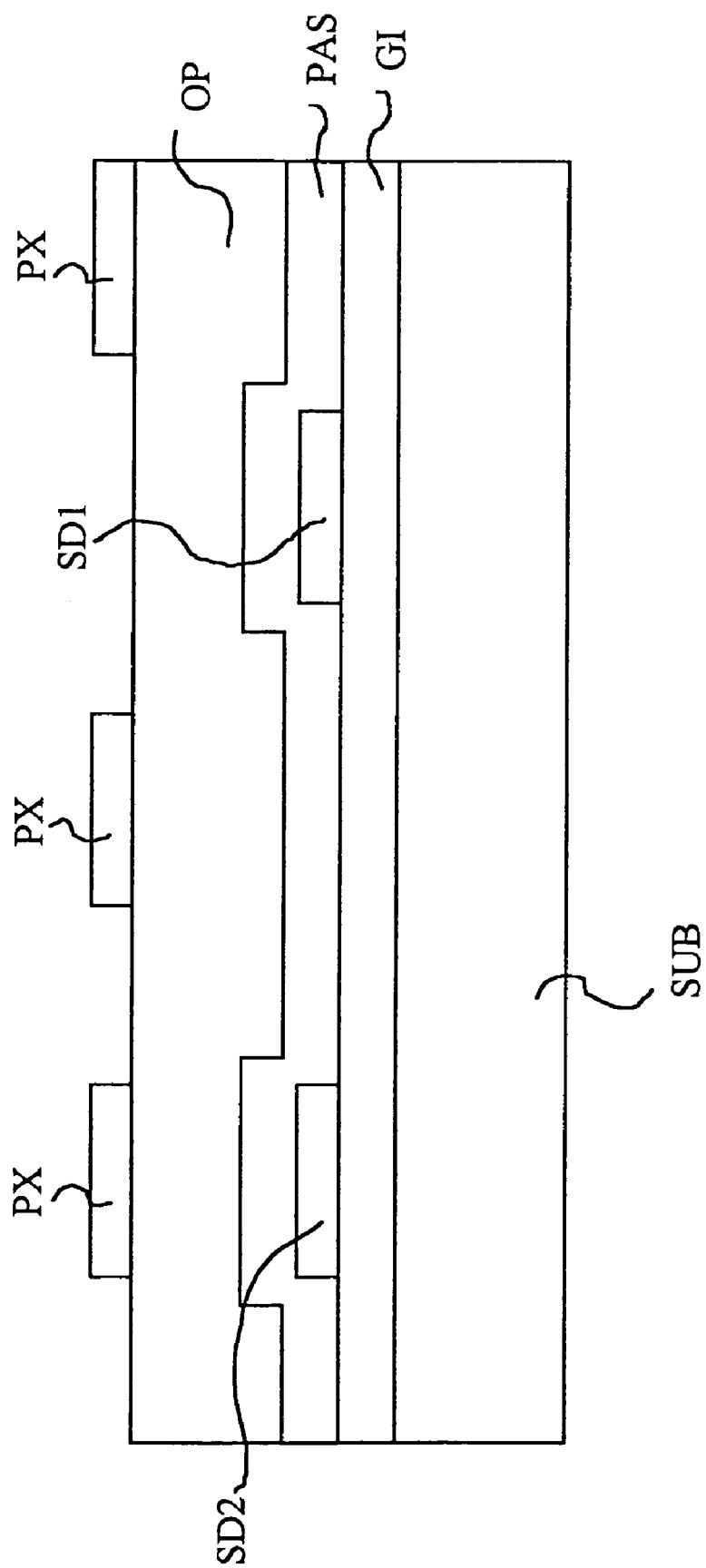

LIQUID CRYSTAL DISPLAY

CROSS-REFERENCES TO RELATED APPLICATIONS

The present application is a Continuation Application of U.S. application Ser. No. 10/936,021, Filed Sep. 7, 2004 now U.S. Pat. No. 6,903,793, which is a Continuation Application of U.S. application Ser. No. 09/754,232, Filed Jan. 3, 2001 now U.S. Pat. No. 6,912,035, which in turn is related to and claims priority from Japanese Patent Application No. 2000-5856, Filed Jan. 7, 2000, all of which are incorporated by reference herein in their entirety for all purposes.

BACKGROUND OF THE INVENTION

The present invention relates to a liquid crystal display device and, more particularly, to a liquid crystal display device which is called In-Plane Switching mode.

Liquid crystal display devices are widely used in various kinds of electronic equipment such as display devices such as display monitors for personal computers and television receivers. Various types of liquid crystal display devices are known. A liquid crystal display device of the type which is called In-Plane Switching (IPS) mode has a liquid crystal panel generally made of two substrates disposed in opposition to each other with a liquid crystal interposed therebetween. In each pixel area on the surface of either one of the substrates that is in contact with the liquid crystal, a pixel electrode is formed and, in addition, a counter electrode is formed at a location close to the pixel electrode. This type of liquid crystal display device generates an electric field (lateral electric field) parallel to the surface of the substrate between the pixel electrode and the counter electrode, thereby controlling the alignment direction of the liquid crystal in the plane between the surfaces of the substrates.

In other words, the In-Plane Switching mode of liquid crystal display device is constructed to control the amount of transmission of light through the area between the pixel electrode and the counter electrode by means of the alignment direction of the liquid crystal to which the electric field is applied. Although a module which includes a liquid crystal panel as well as constituent elements such as a driver circuit and an illuminating light source is generally called a liquid crystal display device, the term "liquid crystal display device" to be used herein collectively indicates both a liquid crystal panel and a liquid crystal display device.

It is known that such a liquid crystal display device is superior in a so-called wide viewing angle characteristic in that the state of its display does not vary even if its display screen is observed in oblique directions.

Each of the pixel electrode and the counter electrode has so far been formed of a conductive layer which does not allow light to be transmitted therethrough.

It has recently been known, however, that one electrode made of a transparent electrode material is formed over the entire area except the periphery of a pixel area, while the other electrode made of a stripe-shaped or rectangular transparent electrode is formed over the one electrode with an insulating film interposed therebetween. Since the transparent electrodes are used for the pixel-driving electrodes, a so-called aperture ratio is greatly increased.

The above-described type of art is disclosed, for example, in SID (Society for Information Display) 99 DIGEST: PP. 202–205 and Japanese Patent Laid-Open No. 202356/1989.

In a so-called large-sized liquid crystal display device having an orthogonal length greater than or equal to 46 cm (nominal 18 inches) or 51 cm (nominal 20 inches), it has been required to lower the resistance of counter lines or voltage application lines (gate lines and drain lines) for switching elements such as thin film transistors TFT.

To meet the demand for lower resistances, aluminum or an alloy which essentially contains aluminum (hereinafter referred to simply as aluminum) is suitably used as the material of such interconnection lines.

In addition, to improve the luminance of the screen of the liquid crystal display device, it is desirable that pixel electrodes and counter electrodes be made of a transparent conductive film (hereinafter referred to as ITO film or the like) such as ITO (Indium Tin Oxide), IZO (Indium Zinc Oxide) or IGO (Indium Germanium Oxide).

In the case where aluminum is used for gate lines, drain lines or counter lines, while ITO or the like is used for pixel electrodes or counter electrodes, it is necessary that ITO or the like which constitutes the pixel electrodes and the counter electrodes be stacked on an aluminum film which constitutes such lines, because of constructional necessity in the formation of electrical connections and a pixel pattern.

However, since aluminum and ITO or the like greatly differ in corrosion potential, there are some cases where during the wet etching of individual patterns for interconnection lines, pixel electrodes or counter electrodes, aluminum is dissolved in a developing solution and ITO or the like is reduced, and transparency is degraded and the transmissivity of pixels is lowered to a great extent.

In addition, there are some cases where if a pattern of ITO or the like is formed after the formation of an aluminum pattern (interconnecting pattern), aluminum is corroded during the etching of ITO or the like and an initial function is lost.

In addition, if an interconnection line is formed of aluminum, it is difficult to electrically connect ITO or the like, which constitutes an oxide transparent conductive layer, with an aluminum film in the state of being in direct contact with the aluminum film. For this reason, if aluminum and ITO or the like are to be brought into electrical contact with each other, a metal film having a small electrical contact resistance with respect to ITO or the like needs to be separately deposited and processed on the aluminum film.

SUMMARY OF THE INVENTION

The present invention solves the various problems of the above-described related arts, and provides a liquid crystal display device having an interconnecting structure and a pixel structure which are suited to large-sized screens.

Therefore, according to the present invention, from among the various kinds of interconnection lines such as gate lines, drain lines and counter lines that are required to constitute a liquid crystal display device, at least interconnection lines to be disposed as the same layer as the gate lines are formed of aluminum or a material which essentially contains aluminum, and then the counter electrodes and pixel electrodes which constitute pixels are formed by using an amorphous transparent conductive film. Representative aspects of the present invention will be described below.

A liquid crystal display device comprising a pair of substrates, a liquid crystal layer interposed between the pair of substrates, a wiring having a stacked structure layer formed on one of the pair of substrates, and a transparent conductive film formed over the wiring, wherein the wiring being included an aluminum layer or an alloy layer essentially containing aluminum, and at least one layer from the following group of molybdenum, aluminum, chromium, tungsten, silver, and copper.

The advantages of the above-described construction of the present invention as well as the reasons for such advantages will be described below in detail.

Since the transparent conductive films (ITO or the like) which constitute the gate line and the pixel are formed on the same plane of the insulative substrate, it is possible to increase the screen size of a liquid crystal display device having a high aperture ratio and a high viewing angle.

After the formation of an aluminum line, when ITO or the like is deposited on the aluminum line as the same layer, a conductive film such as polycrystalline ITO ordinarily causes a strong cell reaction with aluminum in a developing solution during the development of a resist pattern of ITO or the like, and ITO or the like which is an oxide film is reduced. As the result, ITO or the like is blackened, and indium In is separated by, for example, the reaction of $In_2O_5 + e^- \rightarrow 2 \cdot In + (5/2) \cdot O_2(\uparrow)$ in the case of ITO ($In_2O_5$), so that the transmissivity of the conductive film is lowered.

In the case of amorphous ITO or the like, since its corrosion potential is lower than that of polycrystalline ITO or the like, it is possible to reduce the corrosion potential difference between amorphous ITO or the like and aluminum. Accordingly, even if aluminum and ITO or the like lie in the same layer, a cell reaction in a developing solution is restrained, and a transparent conductive film such as ITO can be developed on aluminum.

In addition, since such an amorphous transparent conductive film can be etched by weak acid, the underlying aluminum is prevented from being corroded during the etching of the transparent conductive film. Accordingly, the use of the amorphous transparent conductive film enables a transparent conductive film such as ITO to be etched on aluminum.

In addition, in the case where an aluminum line is used, it is possible to prevent a so-called side hillock without the need for anodization by covering the end surfaces of an exposed aluminum line with ITO or the like before a CVD process.

Specifically, if a protective film is not formed on the exposed portion of the aluminum line by anodization, when an insulating film is deposited by CVD on a stacked line in which molybdenum is stacked as its upper layer, hillocks grow on its end surfaces, so that an interlayer short-circuit occurs with high frequency. To cope with this phenomenon, a comparatively hard film of ITO or the like which covers the end surfaces of the exposed aluminum film is deposited at a comparatively low room temperature of about 120° C. As the result, even if the film of ITO or the like is heated at 300° C. during a CVD process, the aluminum surface covered with the oxide film (ITO or the like) is stable and the occurrence of hillocks can be completely prevented.

In this manner, by covering the exposed portion of the aluminum line with the transparent conductive film, it is possible to improve the breakdown voltage between the gate line and the drain line or between the gate line and the counter line, whereby it is possible to improve the reliability of the liquid crystal display device.

To bring the transparent conductive film of ITO or the like and the counter line into contact with each other, aluminum is oxidized to form an alumina film in one pixel except a terminal portion of molybdenum or a molybdenum alloy or a terminal portion of titanium or a titanium alloy as well as a gate terminal portion. Owing to this alumina film, the intersection of the gate line and the drain line and the intersection of the gate line and the counter line are all formed as a stacked structure film of alumina and an insulating film such as silicon nitride due to plasma treatment, i.e., CVD treatment, and even if the number of such intersections are increased owing to an increase in the resolution of the liquid crystal display device or because of an electrode structure which constitutes a pixel, it is possible to decrease the probability of occurrence of an interlayer short-circuit to a great extent.

Moreover, if a disconnection is to be restrained in a gate line climb-over portion of ITO or the like, ITO or the like is formed as the lowermost layer, and an aluminum line is formed over the layer with molybdenum, a molybdenum alloy, chromium or a chromium alloy interposed therebetween.

In the case where polycrystalline ITO or the like is used, the polycrystalline ITO or the like is formed as a lowermost layer, and a multilayered structure film which contains molybdenum, molybdenum alloy/aluminum/molybdenum or a molybdenum alloy is formed on the layer. During gate-line development treatment, since aluminum does not appear on the surface of the gate line, it is possible to prevent a cell reaction with the underlying ITO or the like.

In the case where the gate line is formed of a stacked structure film of an alloy of aluminum and neodymium (Al—Nd alloy) or of pure aluminum and titanium, a conductive film of amorphous ITO or the like is formed as a layer which underlies the stacked structure film. It is said that Al film or Ti film can be made free of hillocks because the orientation of its crystal grains is aligned. In the case where such a hillock-free aluminum line is used, deposition using CVD can be performed with the surface of the aluminum line exposed. In addition, since amorphous ITO or the like between which and aluminum the corrosion potential difference is small (low) is used as the conductive film of ITO or the like, it is possible to restrain a cell reaction between the aluminum film of the gate line and ITO or the like. The amorphous ITO or the like is crystallized by heat treatment in a later step so that it can be given etching resistance which enables it to endure the etching of aluminum and chromium or molybdenum.

On the supposition that polycrystalline ITO or the like is used, the transparent conductive film of ITO or the like is formed as the lowermost layer. A stacked structure film of molybdenum/aluminum/molybdenum is formed on the layer as the counter line. The lower molybdenum film serves to make contact with the transparent conductive film of ITO or the like which is formed under the lower molybdenum film, and the upper molybdenum film serves as a terminal of a line. In addition, since the aluminum film is covered with molybdenum, ITO or the like and aluminum are prevented from making direct contact with each other in a developing solution. Accordingly, no cell reaction occurs.

Moreover, in the case where the counter electrode is formed in a solid manner in the pixel area, a capacitance increases which is formed by an overlap of the counter electrode and a comb-teeth like pixel electrode which is formed over the counter electrode, and this increase in capacitance is added to the counter electrode and the time constant thereof increases. However, if the counter line is made of aluminum or an aluminum alloy, the amount of resistance can be decreased and an increase in the time constant can be restrained.

As is apparent from the above description, in an In-Plane Switching mode of high viewing angle and high transmissivity, particularly in a liquid crystal display device having a structure in which each pixel electrode is formed in a solid manner over a pixel area, it is possible to restrain an increase in the time constant of an interconnection line, and it is possible to easily increase the screen size of the liquid crystal display device.

In addition, since the gate and counter lines are formed of aluminum or an alloy which essentially contains aluminum, their interconnection resistance can be decreased, and one of electrodes for pixel driving can be formed in the same layer as the gate line or electrode out of a transparent conductive film of ITO or the like, and a comb-teeth like electrode which is the other electrode is formed on a passivation film (insulating film), whereby the capacitance of both electrodes (stacked capacitance) can be designed to be minimized.

In addition, since an aluminum line is used, the occurrence of hillocks can be reduced by oxidizing the required portion of the aluminum line and the occurrence of a display defect such as a smear on the screen is prevented, whereby a highly reliable liquid crystal display device can be obtained.

Incidentally, the present invention is not limited to any of the above-described constructions nor any of the constructions of embodiments which will be described below, and it goes without saying that various modifications can be made without departing from the technical ideas of the present invention.

BRIEF DESCRIPTION OF THE DRAWINGS

Preferred embodiments of the liquid crystal display device according to the present invention will be described below in detail with reference to the following drawings, wherein:

FIG. 21 is a diagrammatic cross-sectional view illustrating the construction of the essential portion of a sixth embodiment of the liquid crystal display device according to the present invention.

DESCRIPTION OF THE SPECIFIC EMBODIMENTS

Preferred embodiments of the liquid crystal display device according to the present invention will be described below.

Figure 1:
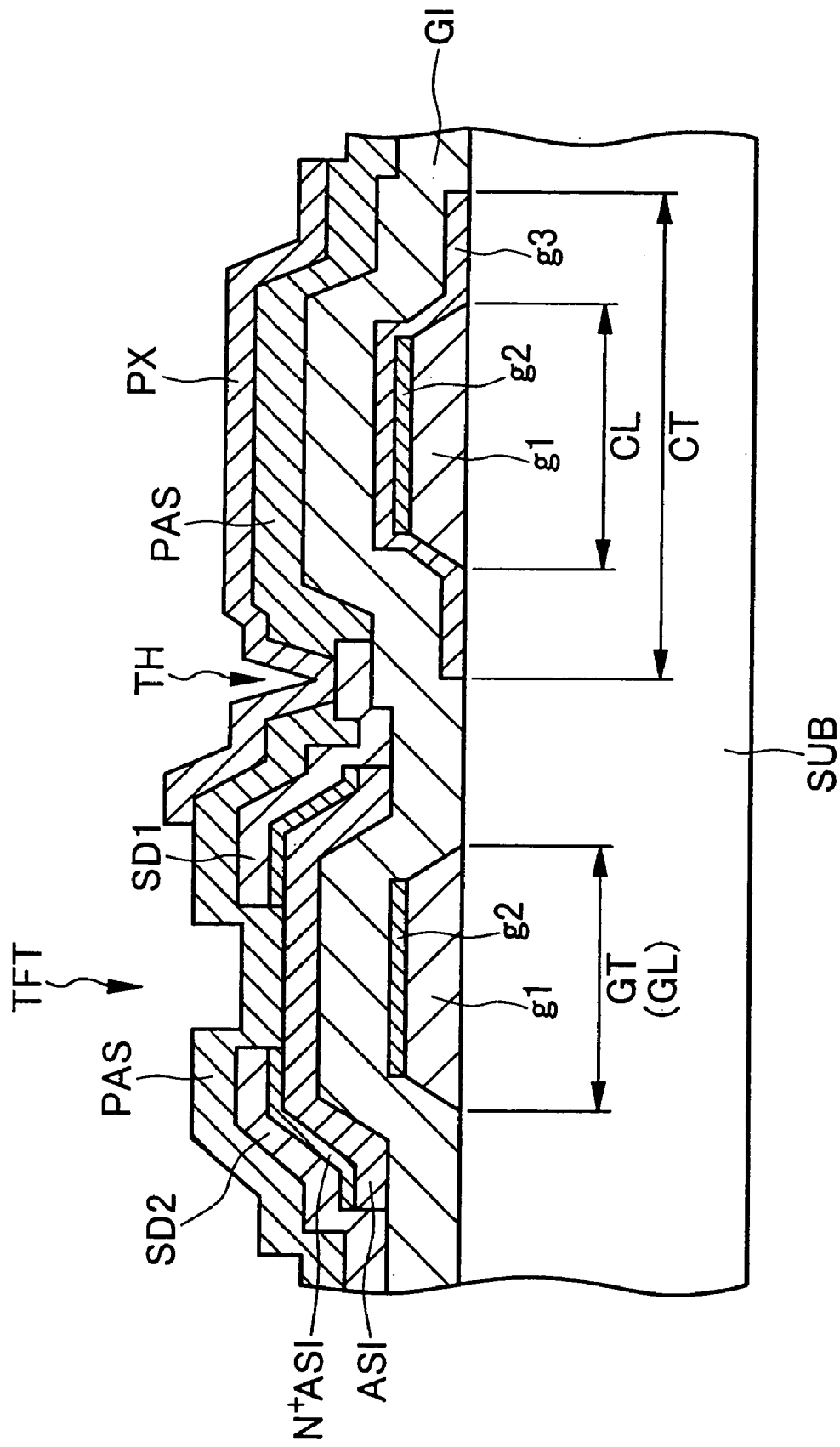
FIG. 1 is a diagrammatic cross-sectional view illustrating the construction of the essential portion of a first embodiment of the liquid crystal display device according to the present invention.

FIG. 1 is a diagrammatic cross-sectional view illustrating the construction of the essential portion of a first embodiment of the liquid crystal display device according to the present invention, and diagrammatically shows a cross section of either one (a lower substrate) of insulative substrates disposed in opposition to each other with a liquid crystal interposed therebetween.

Referring to FIG. 1, a lower substrate SUB is suitably made of a glass substrate, and the inside surface of this lower substrate SUB has a gate line/electrode GT (GL) and a counter electrode/line CT (CL). The gate line/electrode GT (GL) is made of a stacked structure film of an aluminum alloy g1 and a molybdenum alloy g2, while the counter electrode/line CT (CL) is made of a stacked structure film which includes the aluminum alloy g1 and the molybdenum alloy g2 and is covered with a transparent conductive film g3 made of ITO. In FIG. 1, there are shown the gate electrode GT which constitutes a thin film transistor TFT, and the portion of the counter electrode CT that is connected to the counter line CL. Moreover this invention allows to use for g2, at least one layer from the following group of molybdenum, aluminum, chromium, tungsten, silver, and copper formed on said aluminum layer or said alloy layer essentially containing aluminum.

Figure 2:
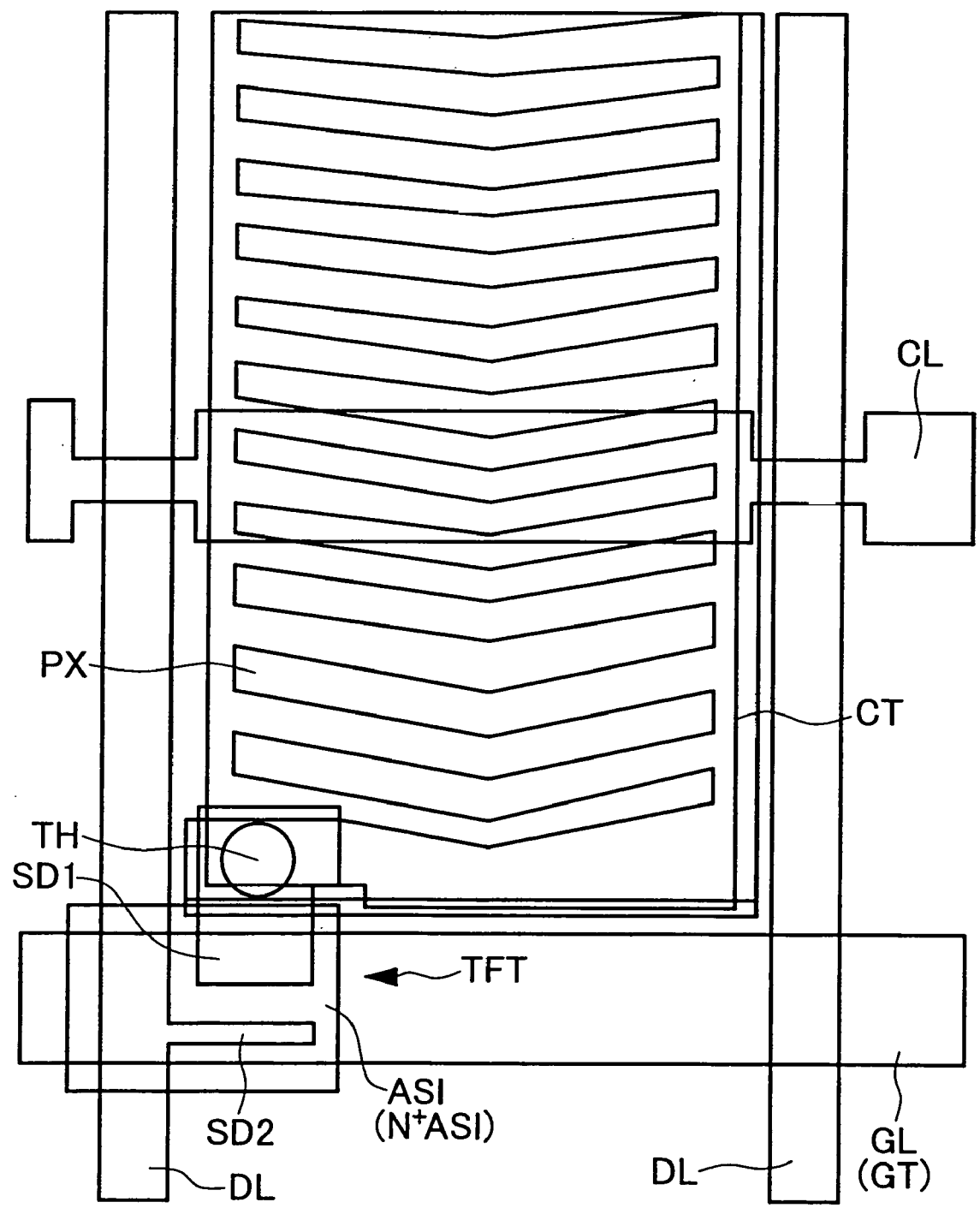
FIG. 2 is a plan view diagrammatically illustrating the plane construction of the one-pixel portion shown in FIG. 1.

These gate line/electrode GT (GL) and counter electrode/line CT (CL) are covered with a gate insulating film GI, and a semiconductor layer, which is made of a semiconductor film ASI and a semiconductor film $N^+$ ASI which constitutes a contact layer, is formed over the gate electrode GT. Source/drain electrodes SD1 and SD2 are separately formed over the semiconductor layer ASI. In FIG. 2, the electrode SD1 is shown as a source electrode, while the electrode SD2 is shown as a drain electrode.

An insulating film PAS is formed to cover the source electrode SD1 and the drain electrode SD2 as well as the counter electrode/line CT (CL). A pixel electrode PX is deposited above the counter electrode/line CT (CL), and is connected to the source electrode SD1 through a contact hole, i.e., a through-hole TH.

FIG. 2 is a plan view diagrammatically illustrating the plane construction of the one-pixel portion shown in FIG. 1. In FIG. 2, symbol DL denotes a drain line, and the portions denoted by the other symbols correspond to portions identical to those shown in FIG. 1. In this type of liquid crystal display device, one pixel is formed in an area surrounded by two drain lines DL and two gate lines GL (one of which is shown).

The counter line CL is disposed to traverse this one pixel area, and the counter electrode CT is connected to the counter line CL and is formed approximately over the entire area of the one pixel. The thin film transistor TFT is formed in the intersection of one of the drain lines DL and the gate line GL and the gate line GL serves as the gate line GL, and the drain electrode SD2 extends from the drain line DL, while the source electrode SD1 is connected to the pixel electrode PX through the through-hole TH.

The fabrication of the construction shown in FIGS. 1 and 2 is as follows. First of all, the aluminum (Al) alloy g1 and the molybdenum (Mo) alloy g2 are deposited in that order to form a stacked structure film on the glass substrate SUB. A photoresist is applied to this stacked structure film, and is dried and patterned. Then, the stacked structure film is subjected to wet etching using an etching solution which essentially contains phosphorus, thereby forming the gate line/electrode GT (GL) and the counter line CL.

Titanium (Ti) may be substituted for the molybdenum alloy g2. If titanium is used, a stacked film of aluminum and titanium is patterned in batch by a dry etching process. The aluminum alloy g1 is suitably an alloy such as an aluminum-neodymium alloy (Al—Nd) which is superior in hillock resistance or an aluminum-silicon alloy (Al—Si), or pure Al. The first embodiment uses an aluminum-neodymium alloy (Al—Nd).

In the case where the molybdenum (Mo) alloy g2 is used as a layer overlying the aluminum alloy g1, a molybdenum-chromium alloy (Mo—Cr) is used which slows down in dry etching rate for a gas which essentially contains fluorine.

The etching rates for both films g1 and g2 are individually controlled by adjusting the composition of the materials of the above-described stacked structure film and the composition of the etching solution, whereby each processed edge has a forward taper as shown in FIG. 1.

Then, the amorphous ITO film g3 is deposited as the counter electrode CT which is a transparent electrode. Instead of ITO, IZO (indium zinc oxide) or IGO (indium germanium oxide) may be used.

In the case of ITO, when ITO is deposited at room temperature by adding water during the deposition, the resultant ITO film is amorphousized. However, because of the deposition at room temperature, the ITO film can be crystallized through heat history in a CVD step. In the case of IZO and IGO, even if IZO or IGO is deposited at a substrate temperature of 200° C., the resultant IZO or IGO film becomes amorphous and can, therefore, obtain an amorphous structure with its high substrate adhesion maintained.

Figure 3:
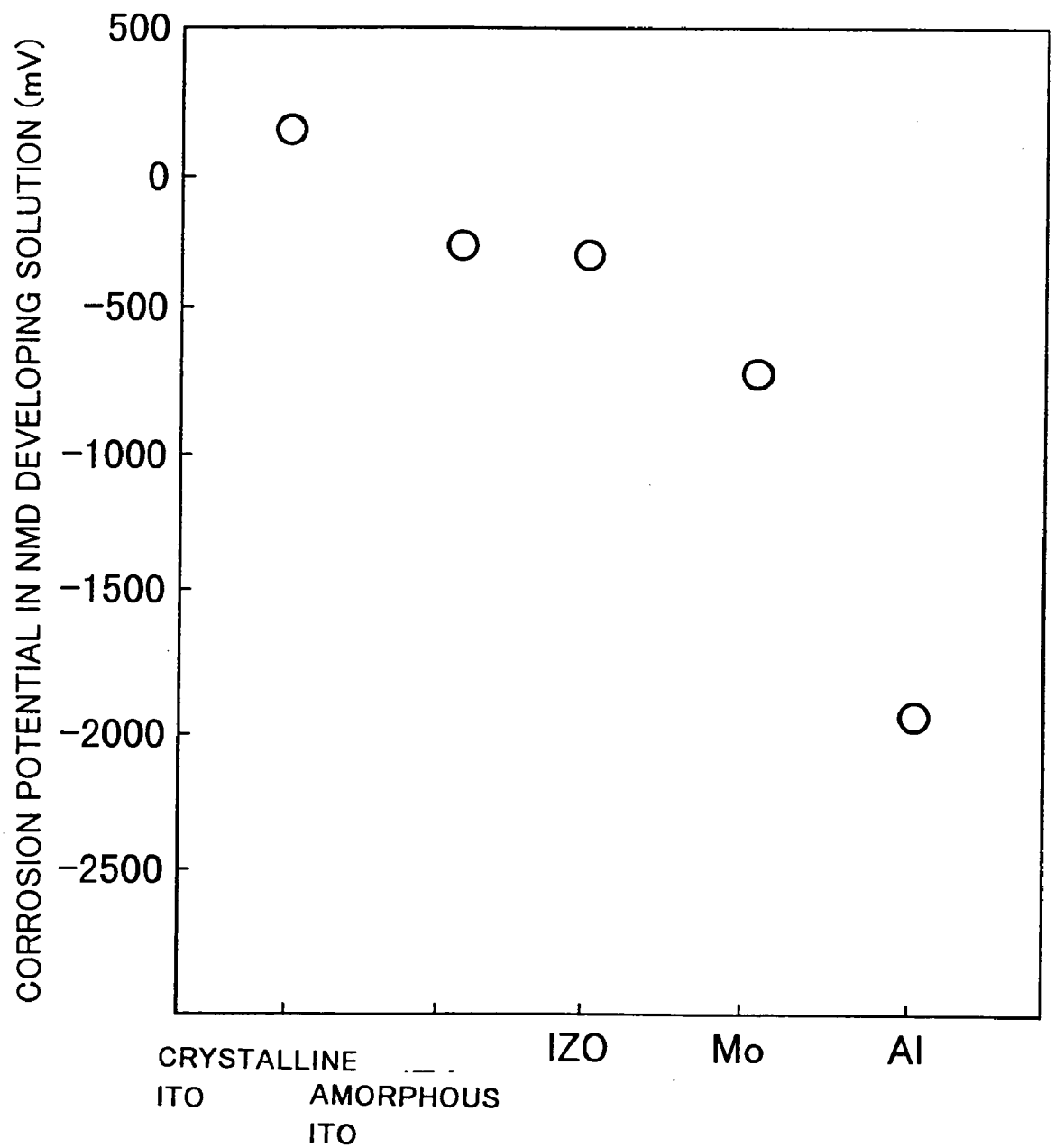
FIG. 3 is an explanatory view showing the effect of the amorphousization of each of transparent conductive films.

FIG. 3 is an explanatory view showing the effect of the amorphousization of each of such transparent conductive films, and shows the differences in corrosion potential among crystalline ITO, amorphous ITO, IZO (originally amorphous), molybdenum (Mo) and aluminum (Al) in a developing solution (a resist developing solution). Incidentally, the developing solution used when the corrosion potentials were measured was NMD (a TMAH (tetra-methyl ammonium hydroxide) 2.38% solution).

As shown in FIG. 3, the corrosion potential of aluminum (Al) in the developing solution is the lowest, and the corrosion potentials of molybdenum (Mo), IZO, amorphous ITO and crystalline ITO become higher in that order. If aluminum (Al) and any of the transparent conductive films (IZO, amorphous ITO and crystalline ITO) are immersed in the developing solution, a cell reaction based on the corrosion potential difference therebetween occurs, and aluminum (Al) is oxidized and the transparent conductive film is reduced.

In the case of ordinary crystalline ITO (polycrystalline ITO), the corrosion potential difference between the ordinary crystalline ITO and aluminum is large, so that their reactions vehemently occur and cause damage to themselves, respectively. On the other hand, in the case of amorphous ITO, the corrosion potential difference between the amorphous ITO and aluminum is small compared to the polycrystalline ITO, although it depends on the composition of materials to be used for the amorphous ITO. Accordingly, the amorphous ITO can restrain damage from being caused to each material film during development.

Figure 4:
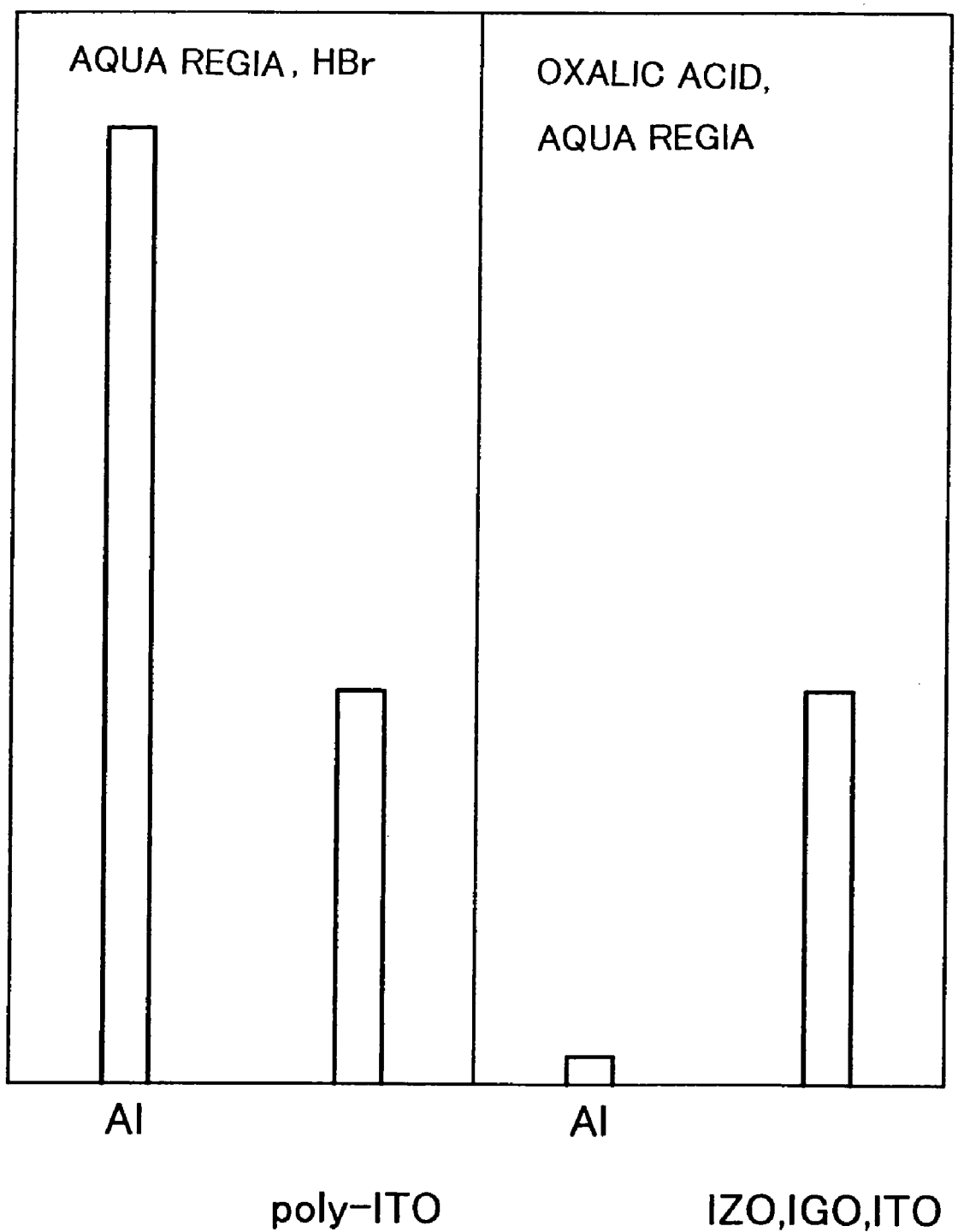
FIG. 4 is an explanatory view of the etching rates of aluminum films and transparent conductive films for an etching solution.

FIG. 4 is an explanatory view of the etching rates of aluminum films and transparent conductive films for an etching solution. The etching rates are shown as relative values. The etching solution uses oxalic acid or aqua regia of low hydrochloric acid concentration. In the case of aqua regia of high hydrochloric acid concentration or hydrobromic acid (HBr), since the etching rate of aluminum is high compared to polycrystalline ITO, damage occurs in an aluminum film lying immediately below an ITO film during the etching of the ITO film. On the other hand, in the case of oxalic acid or aqua regia of low hydrochloric acid concentration, the etching rate of an amorphous ITO film is higher than that of an aluminum film. Accordingly, during the etching of a transparent conductive film such as the amorphous ITO film, damage to the aluminum film directly below the amorphous ITO film is not caused.

The counter electrode which is the transparent electrode is in contact with the counter line via the molybdenum alloy or titanium which is a film overlying the counter electrode. At the interface between the molybdenum alloy or titanium and ITO which is the counter electrode, since the contact resistance is low, good contact characteristics can be obtained.

In addition, since the aluminum alloy exposed on the side edge surfaces of the counter line is covered with ITO, a hillock does not occur in a later CVD step for formation of the gate insulating film and the like.

After that, the gate insulating film, the semiconductor layer film, and the semiconductor film for providing contact are respectively formed by continuously depositing SiN, an amorphous Si film, an $N^+$ amorphous Si film by plasma CVD.

Then, the amorphous Si film which forms the semiconductor layer film and the $N^+$ amorphous Si film which forms the semiconductor film for providing contact are processed by dry etching, thereby preparing island-shaped semiconductor films to form the source electrode and the drain electrode. The source electrode and the drain electrode are deposited by sputtering and patterned by a photolithographic technique, and interconnection lines are processed by wet etching. An alloy which essentially contains chromium or molybdenum is used as the material of the interconnection lines. The alloy which essentially contains chromium is a stacked material of chromium-molybdenum/chromium (Cr—Mo/Cr). The alloy which essentially contains molybdenum is a molybdenum-chromium alloy (Mo—Cr) having high resistance to dry etching.

After the etching of the source electrode and the drain electrode, the contact layer of a channel portion is removed by dry etching with the same etching mask, thereby forming a channel.

After that, the passivation layer is deposited by a CVD method. The contact hole is formed in a portion of the source electrode by dry etching. In addition to this through-hole, through-holes are respectively formed in the terminal portions of the gate electrode, the counter electrode and the source electrodes. To prevent a metal film itself from being etched by drying etching in the uppermost portion of any of the gate electrode, the counter electrode and the source electrode, a material whose drying etching selection ratio is 5 or more with respect to SiN is used.

After that, ITO or the like is again formed as the transparent conductive film which constitutes the pixel electrode. This ITO film is formed in a comb-teeth like shape by a photolithographic technique (refer to the pixel electrode PX shown in FIG. 2). This transparent conductive film may be crystalline or amorphous. If a crystalline transparent conductive film is to be used, aqua regia of high hydrochloric acid concentration or hydrobromic acid (HBr) is used. If an amorphous transparent conductive film is to be used, oxalic acid or aqua regia of low hydrochloric acid concentration is used.

If a crystalline transparent conductive film is processed with hydrobromic acid (HBr) or an amorphous transparent conductive film is etched with oxalic acid, the amount of side etching can be made extremely small. Accordingly, this process is suited to the formation of a fine comb-teeth-like transparent electrode such as that shown in FIG. 2 (the pixel electrode PX).

According to the first embodiment, since the thin film transistor TFT, the individual interconnection lines and the individual electrodes are formed over the substrate (TFT substrate) in the above-described manner, it is possible to provide a liquid crystal display device which has the fine transparent comb-teeth like electrode (the pixel electrode PX) and the plane transparent electrode (the counter electrode CT) and is, therefore, greatly improved in optical transmissivity. In addition, although the capacitance at the intersection of the transparent electrodes increases, interconnection resistance is decreased and an increase in time constant can be restrained, because aluminum is used for the counter line.

The plane transparent electrode (CT) is formed in a solid shape which covers the entire pixel, but even if the plane transparent electrode (CT) is formed in the shape of comb teeth which alternate with the teeth portions of the upper comb-teeth like electrode (PX), as in an ordinary IPS type of liquid crystal display device, the aperture ratio of the liquid crystal display device can similarly be improved.

Figure 5:
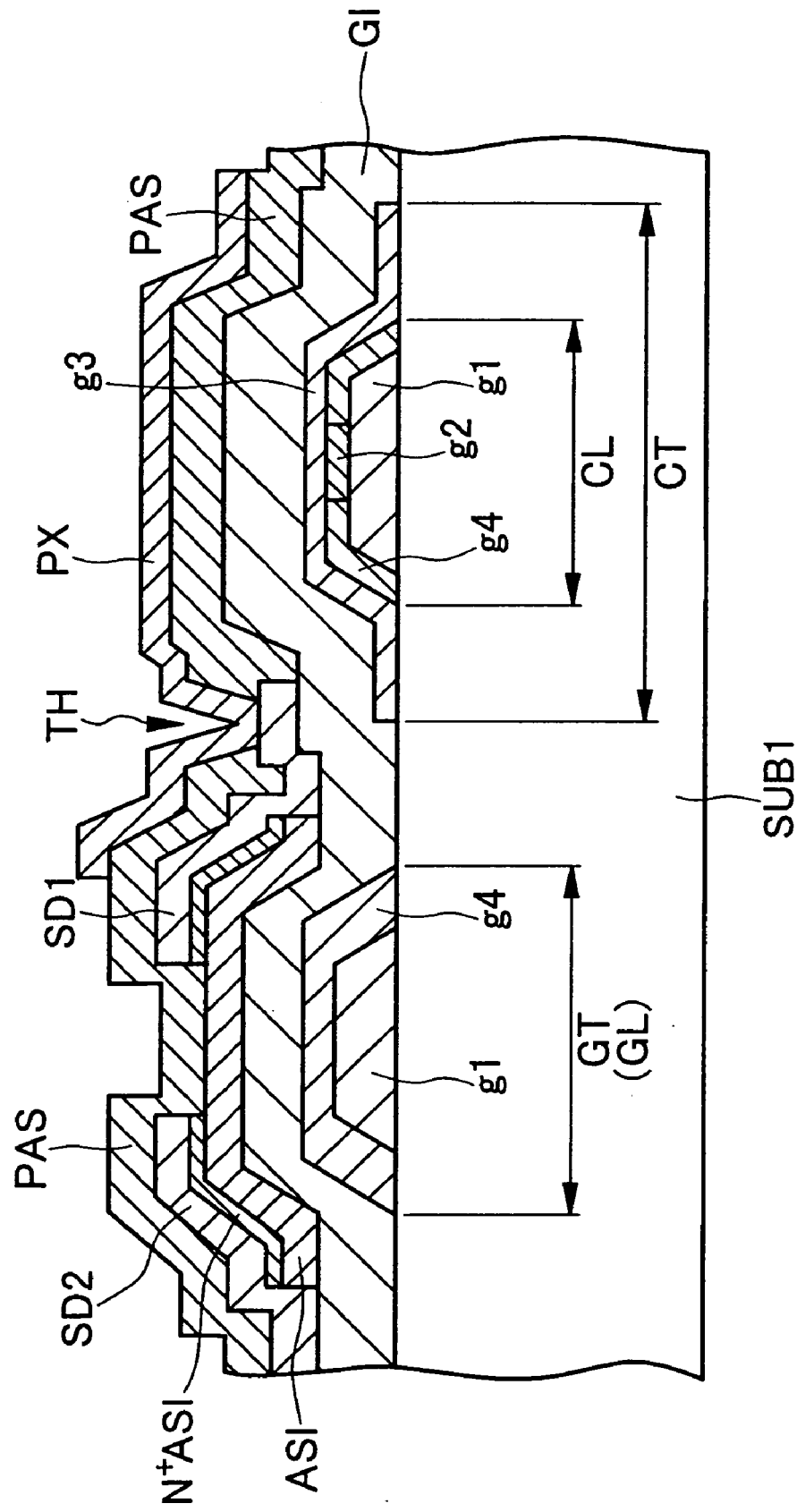
FIG. 5 is a diagrammatic cross-sectional view illustrating the construction of the essential portion of a second embodiment of the liquid crystal display device according to the present invention.
Figure 6:
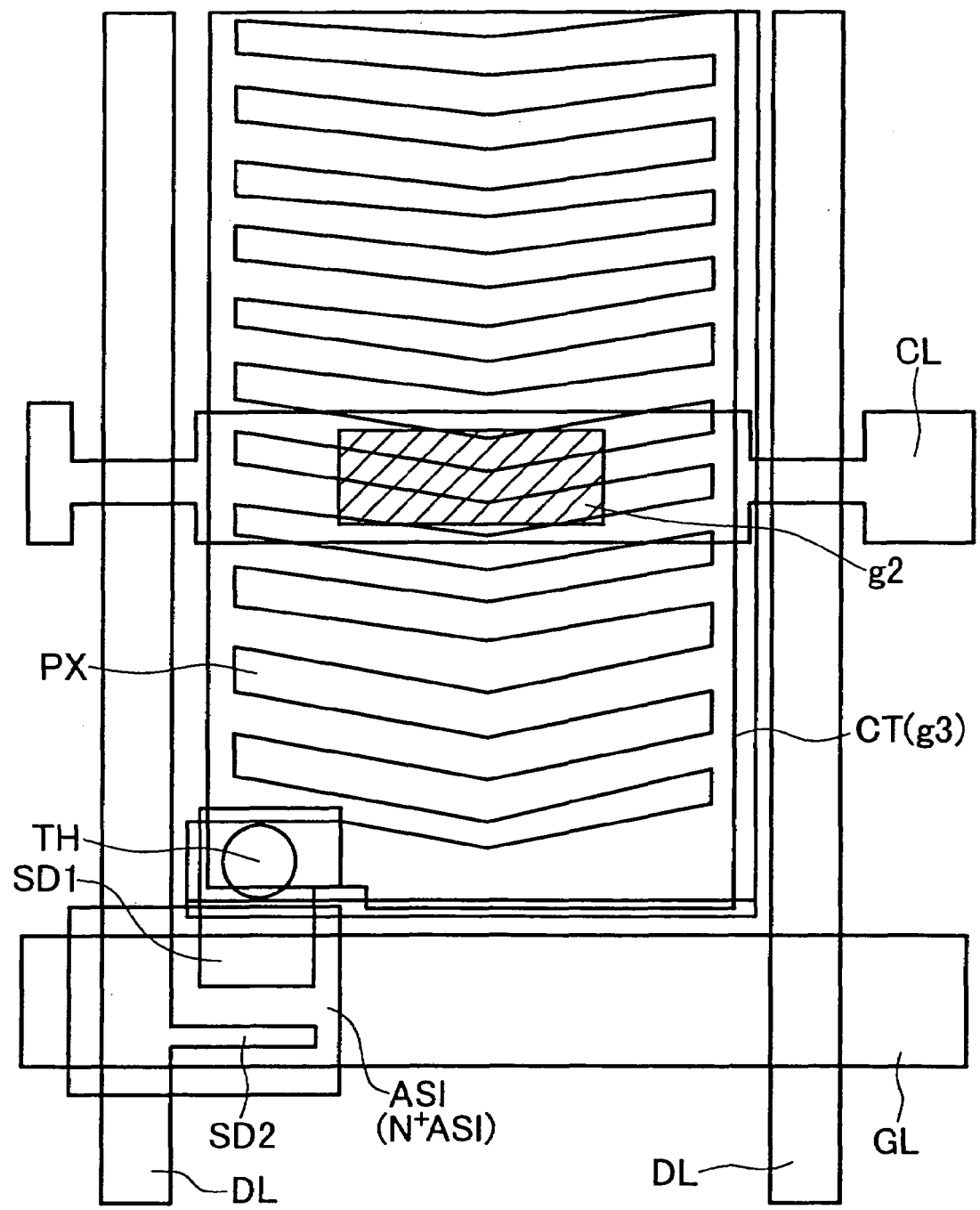
FIG. 6 is a plan view diagrammatically illustrating the plane construction of the one-pixel portion shown in FIG. 5.

FIG. 5 is a diagrammatic cross-sectional view illustrating the construction of the essential portion of a second embodiment of the liquid crystal display device according to the present invention, and diagrammatically shows a cross section of either one (a lower substrate) of insulative substrates disposed in opposition to each other with a liquid crystal interposed therebetween. FIG. 6 is a plan view diagrammatically illustrating the plane construction of the one-pixel portion shown in FIG. 5. FIGS. 7 to 12 are views illustrating the process of fabricating a TFT substrate of the second embodiment. Moreover this invention allows to use for g2, at least one layer from the following group of molybdenum, aluminum, chromium, tungsten, silver, and copper formed on said aluminum layer or said alloy layer essentially containing aluminum.

Figure 7:
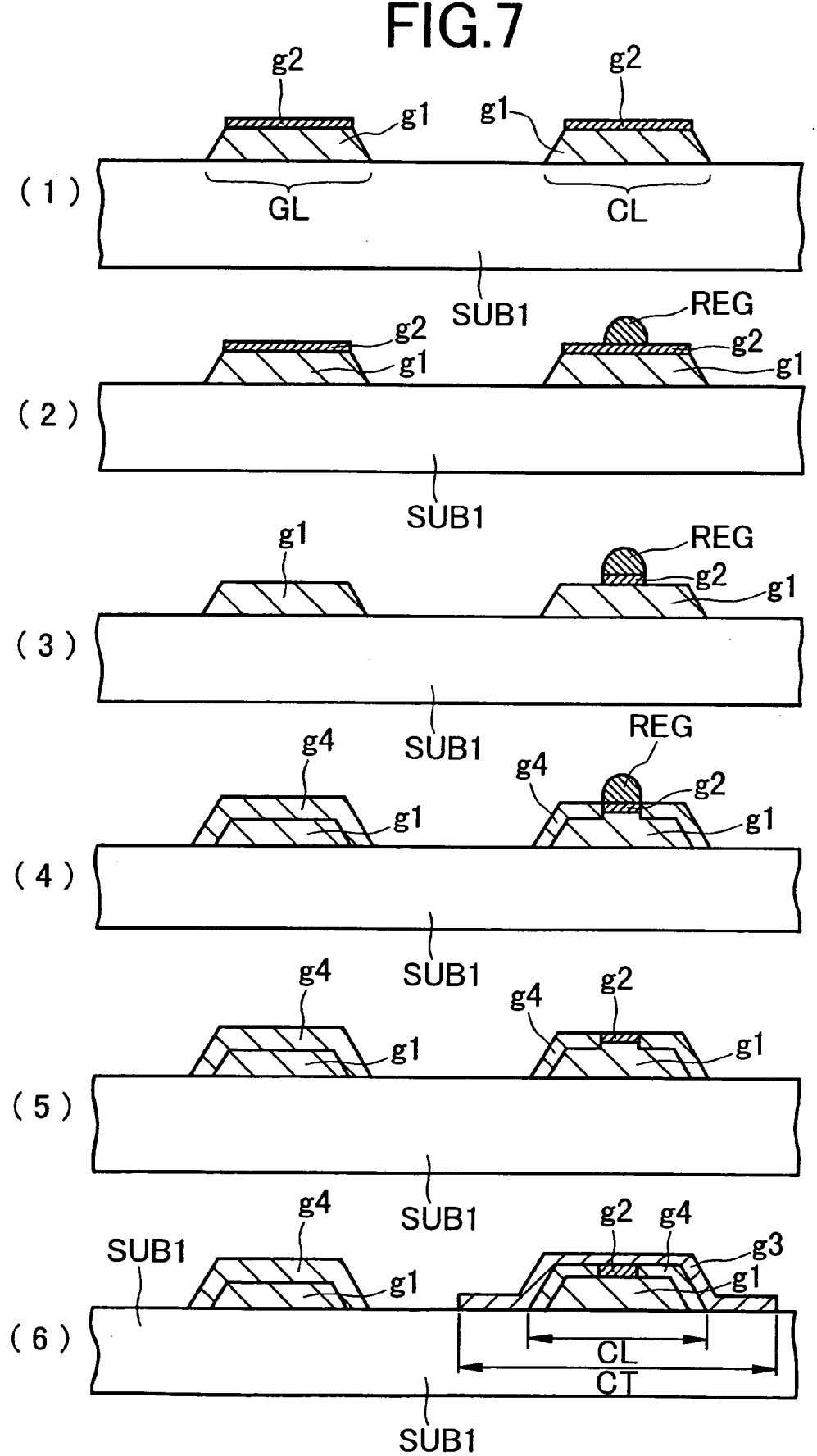
FIG. 7 is a view of the process of fabricating a gate line and a counter line/electrode.
Figure 8:
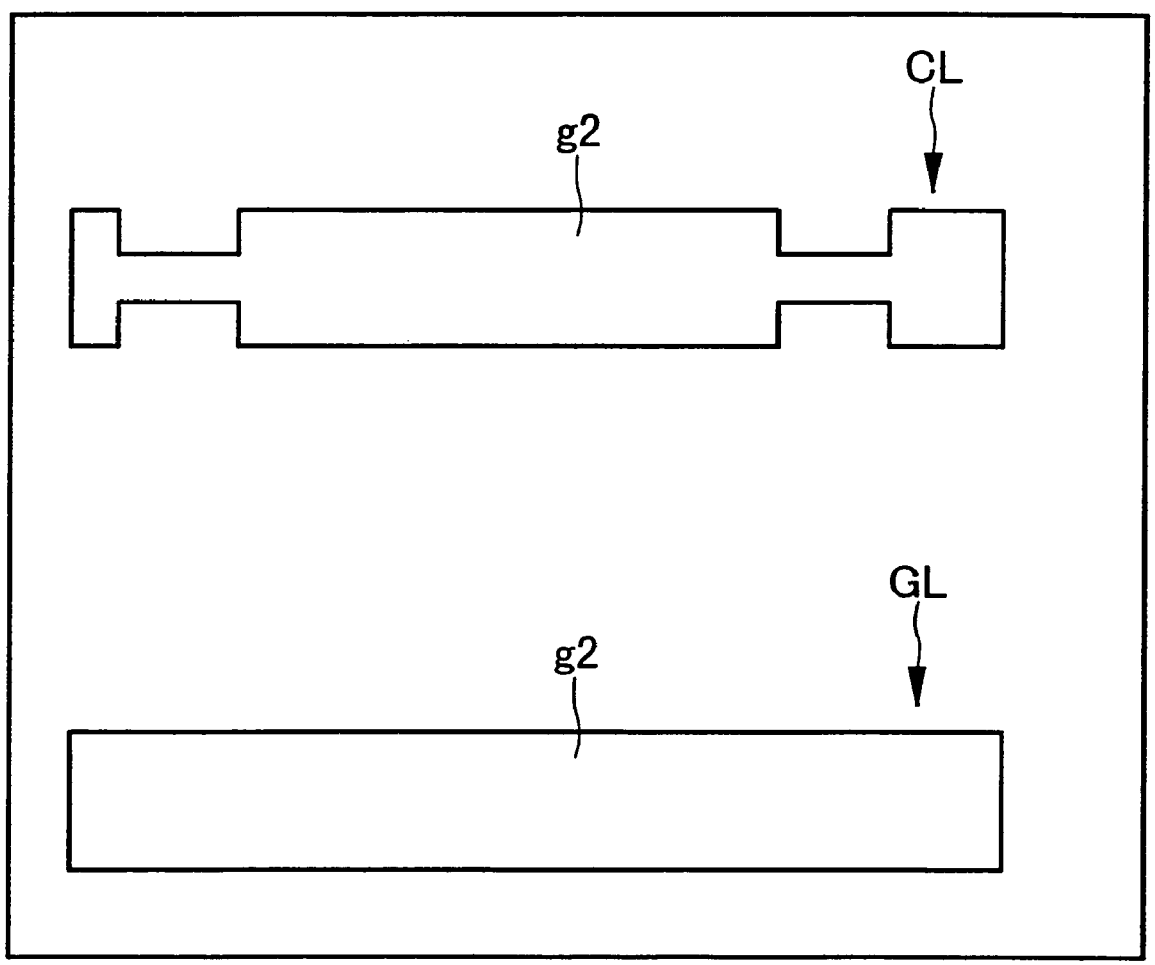
FIG. 8 is a diagrammatic plan view further illustrating the process of FIG. 7.
Figure 9:
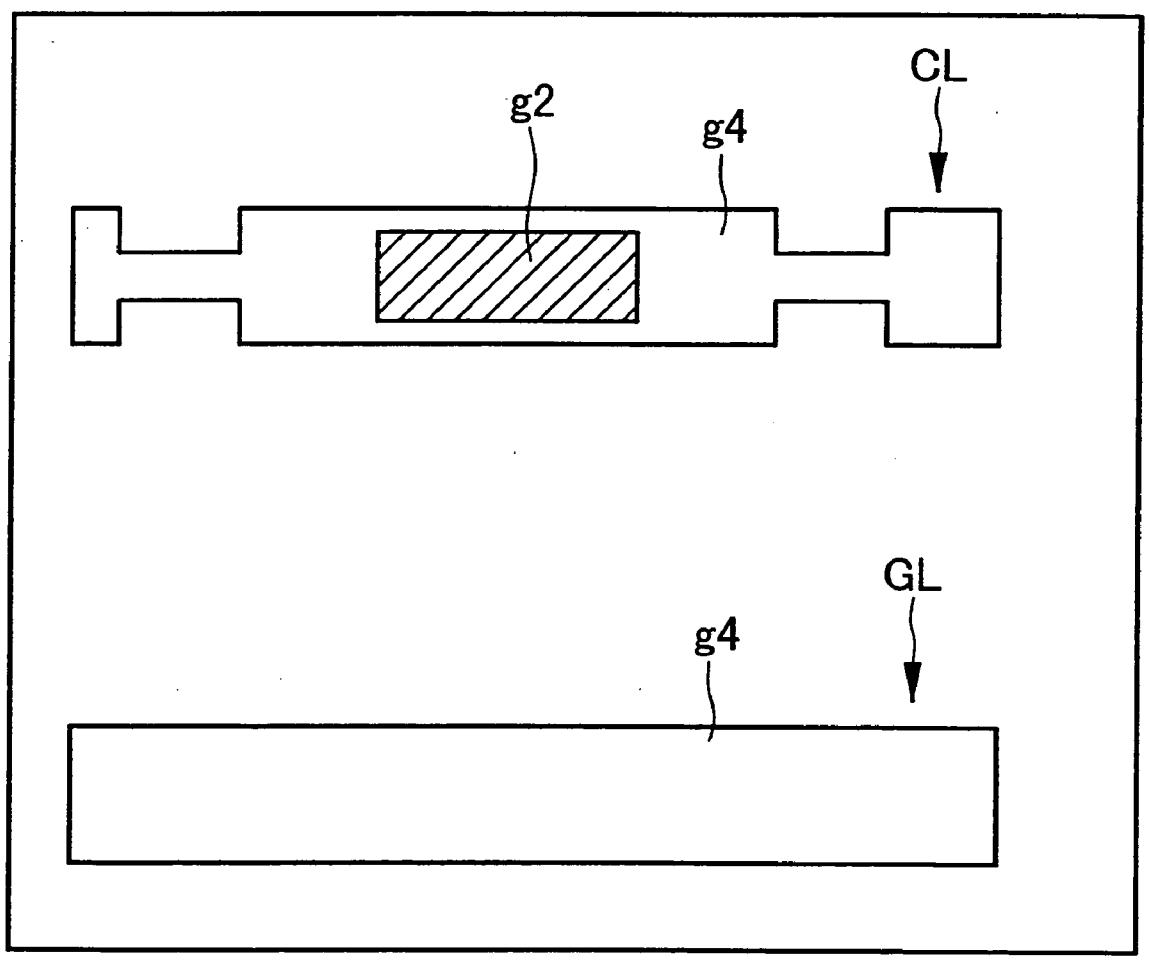
FIG. 9 is a diagrammatic plan view following FIG. 8, further illustrating the process of FIG. 7.
Figure 10:
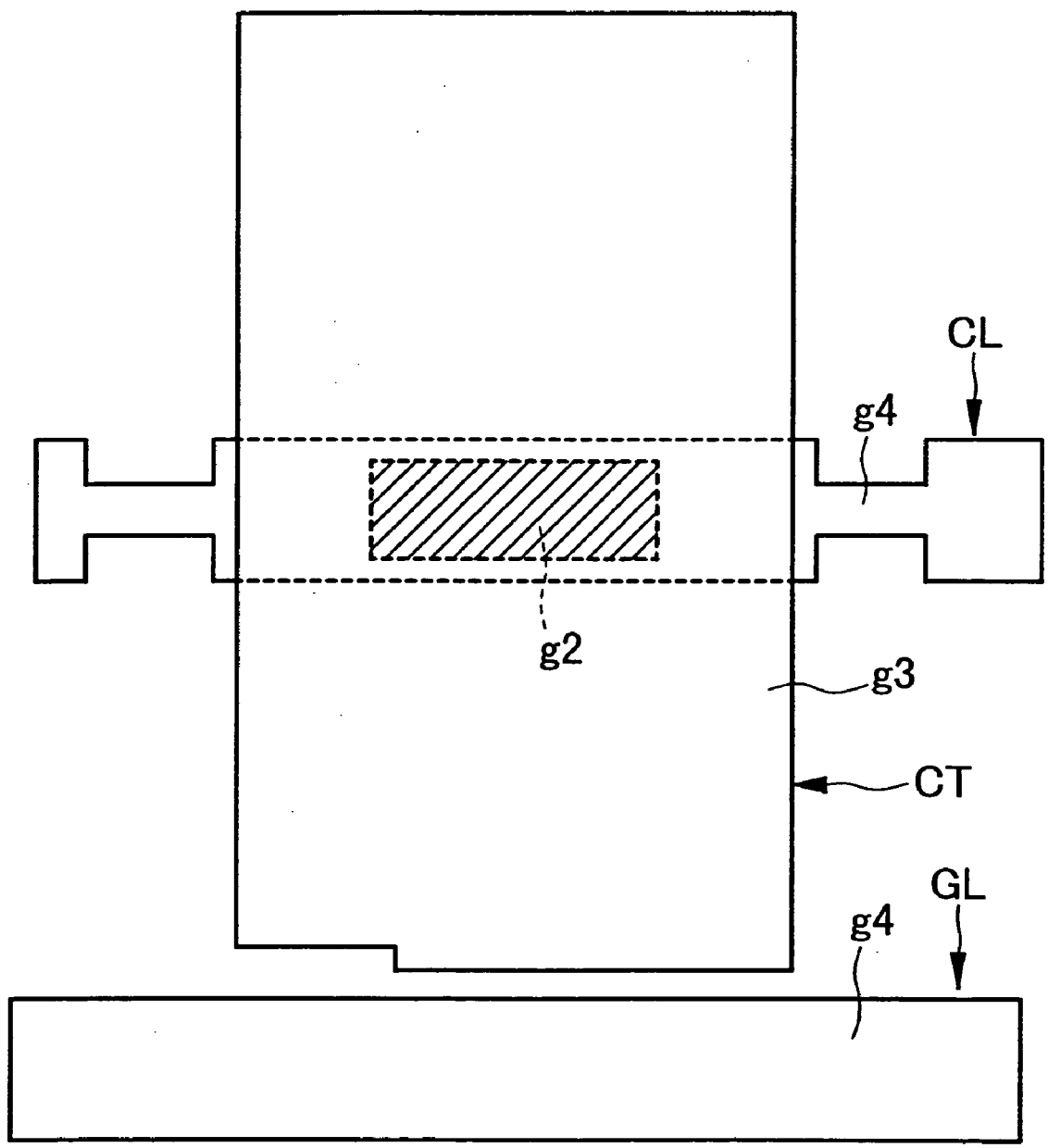
FIG. 10 is a diagrammatic plan view following FIG. 9, further illustrating the process of FIG. 7.

FIG. 7 is a view of the process of fabricating a gate line and a counter line/electrode, and FIGS. 8 to 12 are plan views of the essential portion of the TFT substrate, further illustrating the process shown in FIG. 7.

In the second embodiment, the inside surface of a lower substrate SUB 1 has a gate line/electrode GT (GL) and a counter line CL each formed of an aluminum film g1. The gate line/electrode GT (GL) has an alumina film g4 which covers the entire surface of the aluminum film g1, and the counter line CL has the alumina film g4 which similarly covers the upper surface of the aluminum film g1, and also has a film g2 of molybdenum or titanium (in the second embodiment, molybdenum) which is formed in a portion of the alumina film g4 in such a manner as to extend from the upper surface of the alumina film g4 to the aluminum film g1.

Incidentally, in terms of an improvement in the quality of oxide film, it is effective to form a coated type of glass film SOG on the glass substrate SUB1 in order to promote the oxidation of the surface of the AL film.

A transparent conductive film ITO which constitutes the counter electrode CT covers the alumina film g4, and is formed approximately over the entire area of the pixel area, as shown in FIG. 6, and is formed to make good contact to the aluminum film g1 which constitutes the counter line CL, via the molybdenum film g2 deposited on a portion of the top of the aluminum film g1. A specific position of the molybdenum film g2 is shown in FIG. 6. Incidentally, the plan shape of the molybdenum film g2 is not limited to the rectangular shape shown in FIG. 6, and may be a diamond shape, a circular shape (including an elliptical shape), or a combination of plural appropriate shapes.

The alumina film g3 which covers the aluminum film g1 of the counter line CL does not make good contact to the transparent conductive film ITO which constitutes the counter electrode CT stacked on the alumina film g3. Accordingly, the molybdenum film g2 is deposited to extend from the upper surface of the alumina film g3 to the underlying aluminum film g1, thereby improving the contact between the counter line CL and the counter electrode CT.

Then, as in the first embodiment described above in connection with FIGS. 1 to 4, a gate insulating film GI, a semiconductor film ASI, a semiconductor film $N^+$ ASI, a source electrode SD1, a drain electrode SD2, an insulating film PAS, and a pixel electrode PX are formed over the gate line/electrode GL (GT), the counter line CL and the counter electrode CT.

The process of fabricating the second embodiment will be described below with reference to FIGS. 7 to 12. As shown in Step (1) of FIG. 7, a stacked structure film of the aluminum alloy (in the second embodiment, an aluminum-neodymium alloy: Al—Nd) film g1 and the molybdenum alloy or titanium alloy or chromium alloy (in the second embodiment, a molybdenum-chromium alloy: Mo—Cr) film g2 is formed and patterned to form the gate line/electrode GL (GT) and the counter line CL. A plan view of this state is diagrammatically shown in FIG. 8.

Then, a photoresist REG is formed on a portion which makes contact to the transparent conductive film ITO which constitutes the counter electrode CT to be formed on the Mo—Cr film g2 which is a layer to overlie the counter line CL (Step (2) of FIG. 7). This photoresist REG is formed into a predetermined pattern through the application of a photoresist material and exposure and development thereof through a mask.

The substrate SUB1 having the photoresist REG formed over the counter line CL is subjected to etching, whereby the Mo—Cr film g2 is removed except the portion thereof which underlies the photoresist REG. At the same time, the Mo—Cr film g2 which overlies the gate line GL is also removed (Step (3) of FIG. 7).

The surface of the Al—Nd film g1 is oxidized with the photoresist REG left, and the alumina film g4 is formed over the portion of the counter line CL which excludes the remaining Mo—Cr film g2 as well as over the surface of the gate line GL (Step (4) of FIG. 7). Incidentally, in this surface oxidation, the thickness of the Al—Nd film g1 exposed on the surface of the substrate SUB 1 is slightly reduced due to the formation of the alumina film g4. A plan view of this state is diagrammatically shown in FIG. 9.

After that, the photoresist REG is removed to expose the Mo—Cr film g2 (Step (5) of FIG. 7). The exposed Mo—Cr film g2 becomes a contact film.

After the removal of the photoresist REG, the amorphous transparent conductive film g3 is deposited to cover the counter line CL, thereby forming the counter electrode CT (Step (6) of FIG. 7). A plan view of this state is diagrammatically shown in FIG. 10.

In the second embodiment, the counter electrode CT has a plane shape, but it may be processed into a comb-teeth like shape in the case of ordinary IPS mode.

The above-described ITO or the like is used as the amorphous transparent conductive film g3. A major part of the aluminum alloy (Al—Nd) film g1 which constitutes the gate line GL and the counter line CL is covered with the alumina film g4 so that the surface of neither of the aluminum film g1 and the counter electrode CT does not directly contact an etching solution. Accordingly, a crystalline transparent conductive film may also be used as the transparent conductive film g3.

Figure 11:
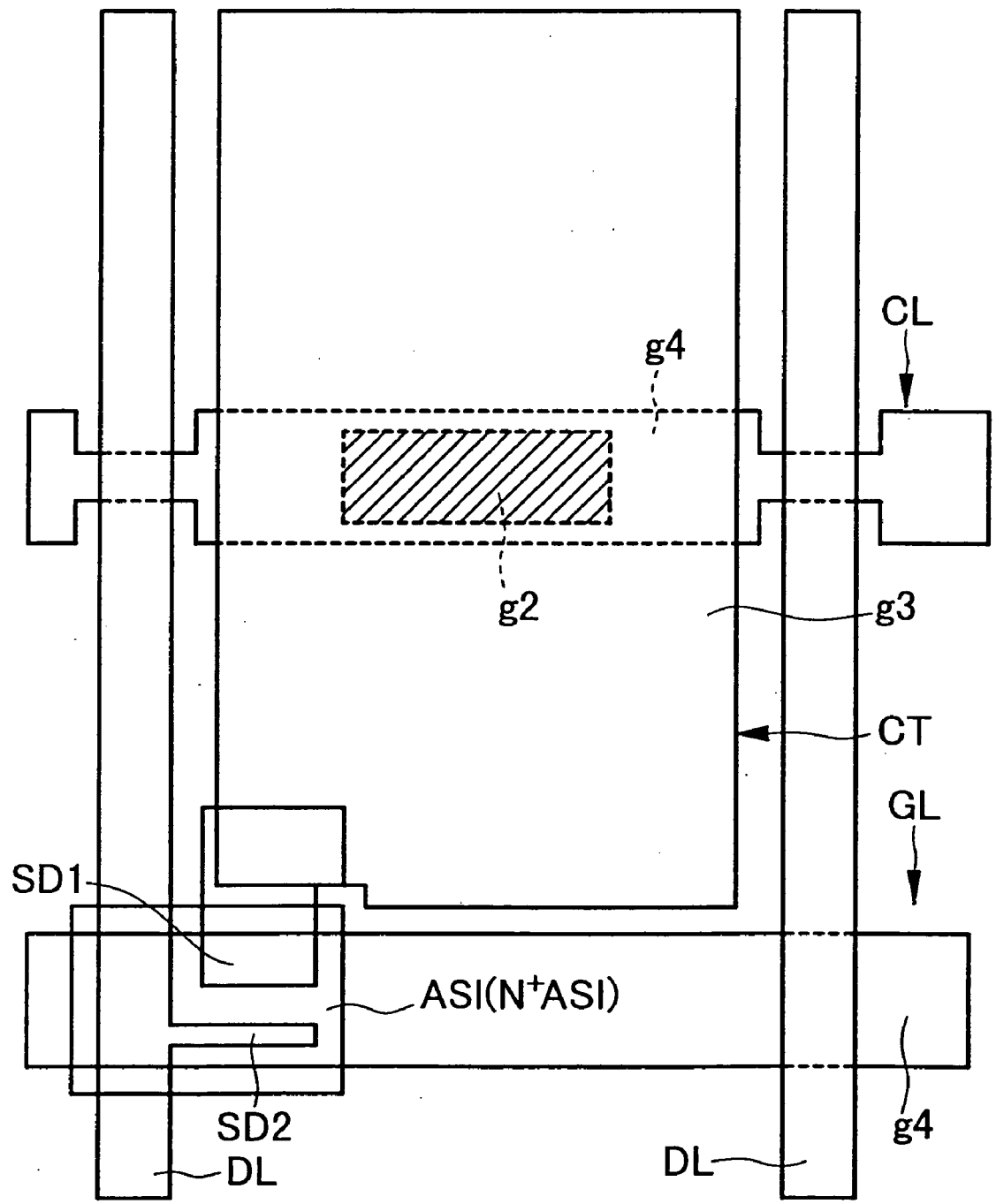
FIG. 11 is a diagrammatic plan view following FIG. 10, further illustrating the process of FIG. 7.

After the formation of the counter electrode CT, the semiconductor layer ASI and the semiconductor layer N$^+$ASI which serves as a contact layer, the source electrode SD1, the drain line DL and the drain electrode SD2 are formed as shown in FIG. 11.

Figure 12:
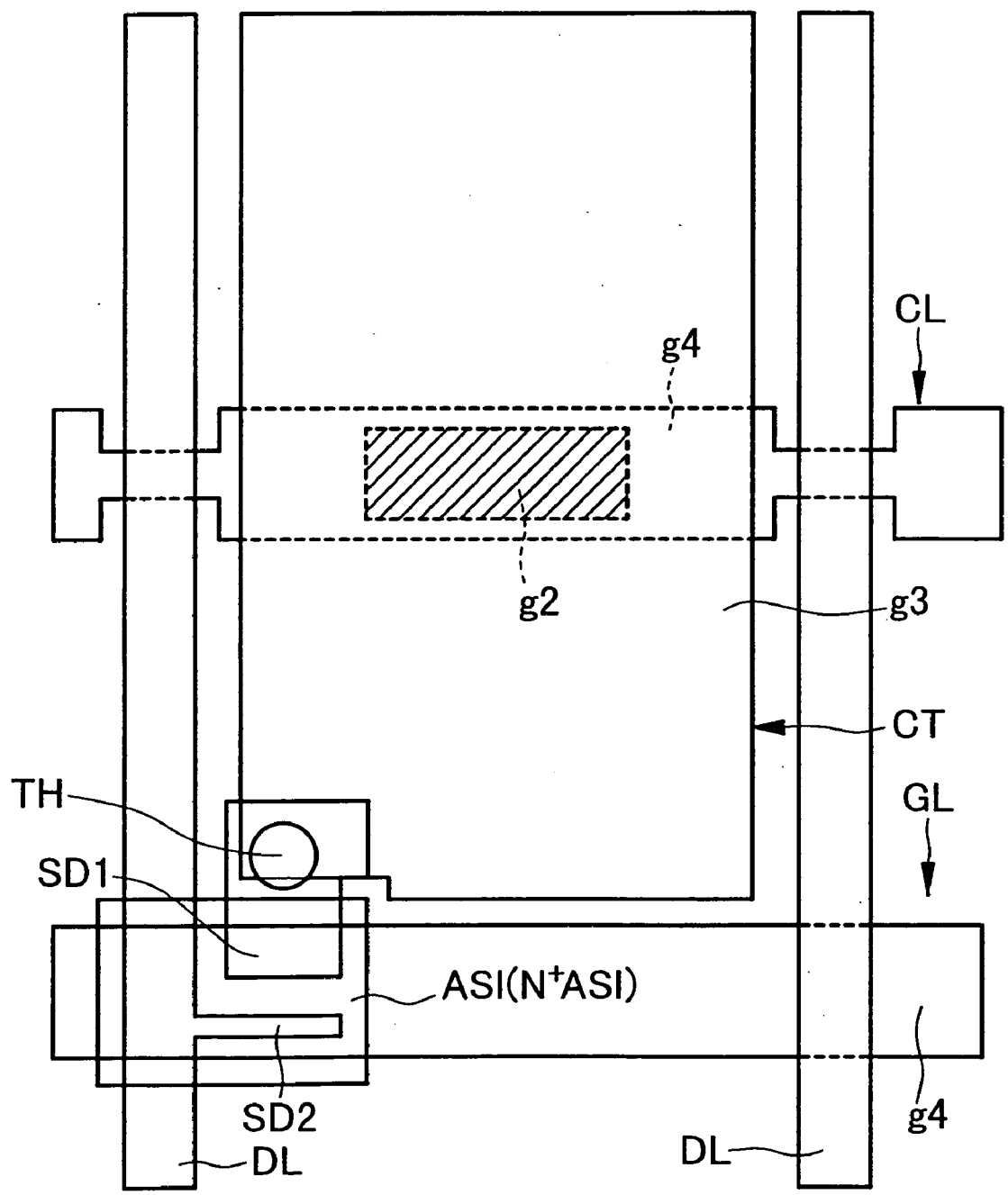
FIG. 12 is a diagrammatic plan view following FIG. 11, further illustrating the process of FIG. 7.

Furthermore, after the formation of the insulating film PAS, as shown in FIG. 12, a through-hole TH is formed to extend to the source electrode SD1 through the insulating film PAS, and a pixel electrode PX made of a comb-shaped transparent conductive film is formed (refer to FIGS. 5 and 6).

In the second embodiment, since the gate line/electrode GL (GT) and the counter line CL both of which use the aluminum alloy are subjected to surface oxidation treatment, it is possible to prevent a decrease in breakdown voltage and achieve a great improvement in reliability, as compared with the case in which interlayer insulation is realized with only the gate insulating film GI (SiN). In addition, since the contact portion of the counter line CL which is a non-anodized portion has a stacked structure of molybdenum which is a high-melting point metal, molybdenum/titanium, molybdenum/chromium or the like, a hillock can be completely prevented from occurring on the aluminum film.

Figure 13:
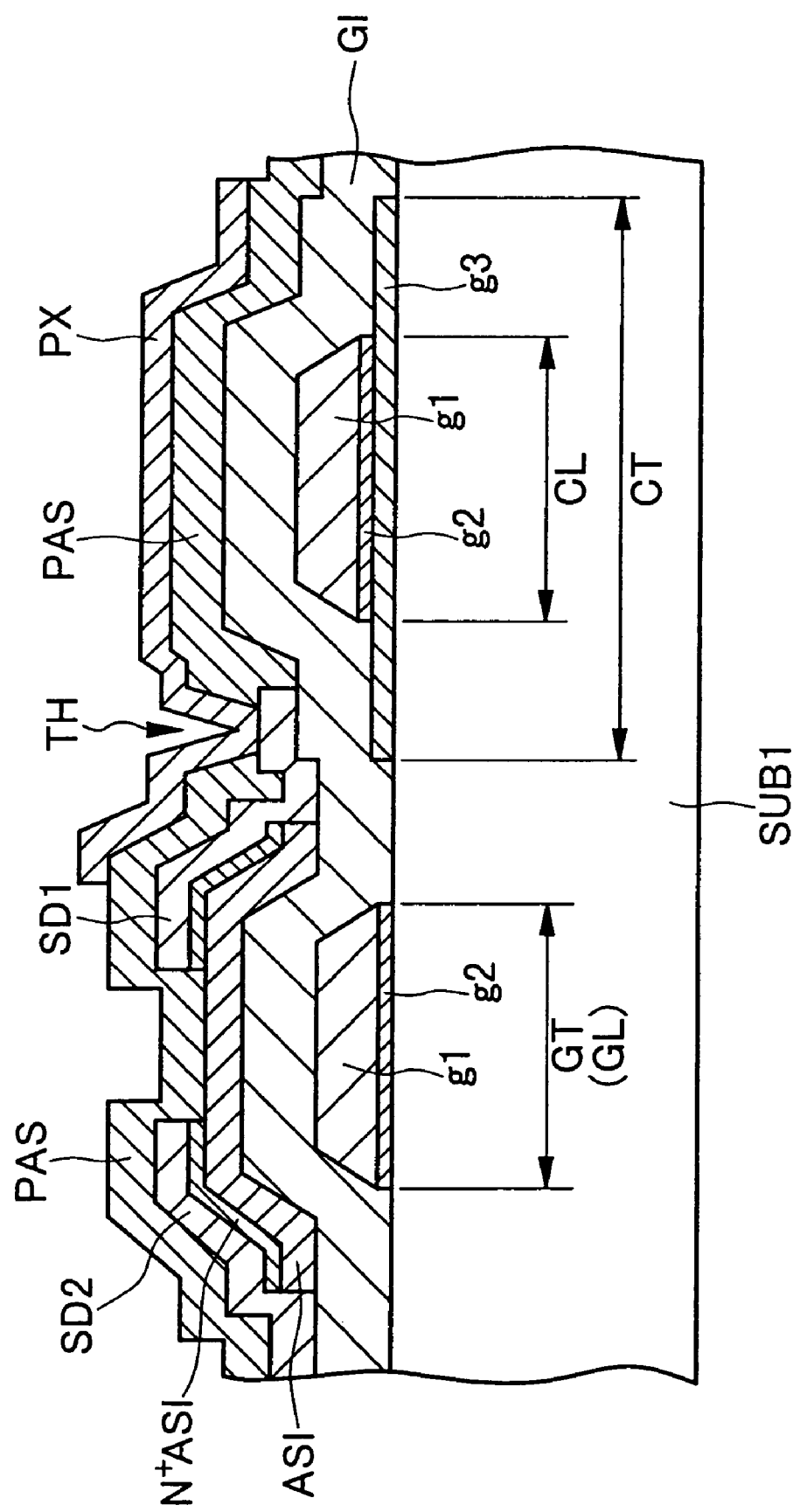
FIG. 13 is a diagrammatic cross-sectional view illustrating the construction of the essential portion of a third embodiment of the liquid crystal display device according to the present invention.

FIG. 13 is a diagrammatic cross-sectional view illustrating the construction of the essential portion of a third embodiment of the liquid crystal display device according to the present invention, and diagrammatically shows a cross section of either one (a lower substrate) of insulative substrates disposed in opposition to each other with a liquid crystal interposed therebetween.

In the third embodiment, ITO or the like is formed on the inside surface of a TFT substrate SUB1 as an amorphous transparent conductive film g3. The counter line CL is made of a stacked structure film which has a chromium, molybdenum or titanium film g2 as a base (a lower layer) and an aluminum alloy (such as Al—Nd) film g1 as an upper layer.

Both the chromium, molybdenum or titanium film g2 which is the lower layer constituting the counter line CL and the amorphous transparent conductive film g3 which constitutes the counter electrode CT have good contact characteristics.

During etching treatment for patterning the stacked structure film of the aluminum alloy film g1 and the chromium, molybdenum or titanium film g2, cell reactions based on the corrosion potential difference between the upper and lower layers in a developing solution occur in both of the upper and lower layers which constitute the stacked structure film. To restrain the cell reactions, an amorphous transparent conductive film which enables such corrosion potential difference to become small is used. In the third embodiment, a 120 film is used.

Incidentally, a transparent conductive film is not formed between the gate line/electrode GL (GT) and the glass substrate SUB1.

According to the third embodiment, since the transparent conductive film g3 which constitutes the counter electrode CT is directly formed on the glass substrate (TFT substrate) SUB1, there is not a "pattern climb-over portion" in which a pattern climbs over an interconnection line, and therefore, a problem such as a disconnection caused by the pattern climb-over portion does not occur. Accordingly, it is possible to obtain a liquid crystal display device having high reliability. Moreover this invention allows to use for g2, at least one layer from the following group of molybdenum, aluminum, chromium, tungsten, silver, and copper formed on said aluminum layer or said alloy layer essentially containing aluminum.

Figure 14:
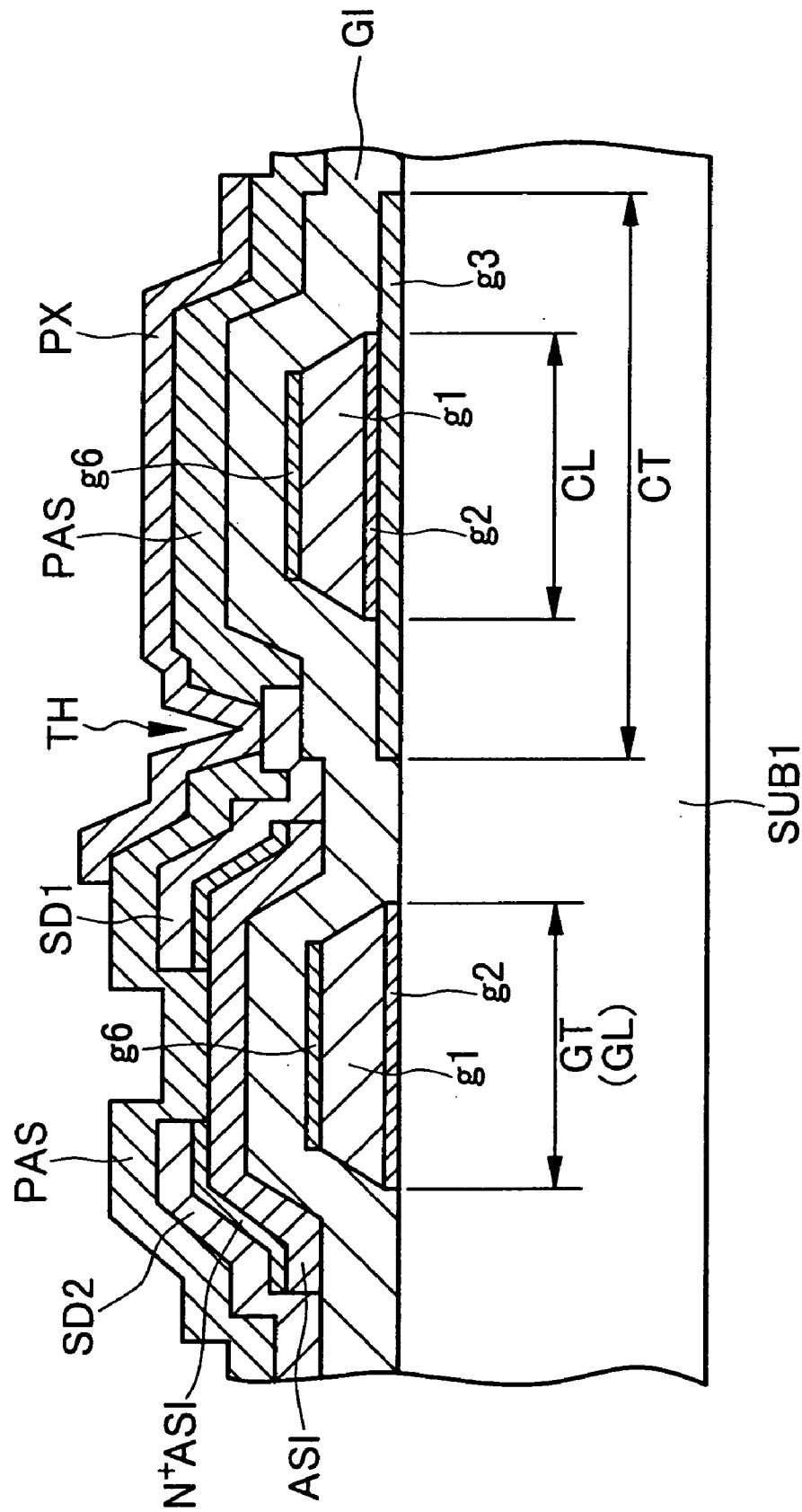
FIG. 14 is a diagrammatic cross-sectional view illustrating the construction of the essential portion of a fourth embodiment of the liquid crystal display device according to the present invention.

FIG. 14 is a diagrammatic cross-sectional view illustrating the construction of the essential portion of a fourth embodiment of the liquid crystal display device according to the present invention, and diagrammatically shows a cross section of either one (a lower substrate) of insulative substrates disposed in opposition to each other with a liquid crystal interposed therebetween.

In the fourth embodiment, a film g3 of amorphous or polycrystalline ITO or the like is formed on the inside surface of a TFT substrate SUB1 as a transparent conductive film which constitutes a counter electrode CT, and a stacked structure film (three-layer structure film) made of a molybdenum or titanium film g2, an aluminum film g1 and a molybdenum or titanium film g6 is formed on the film g3. Incidentally, the film g3 of ITO or the like is not formed below the gate line/electrode GL (GT).

Since the aluminum film g1 which constitutes the stacked structure film underlies the molybdenum or titanium film g6, the surface of the aluminum film is prevented from making direct contact to an etching solution during the patterning of the stacked structure film. Accordingly, since the aluminum film and the transparent conductive film never coexist in the same etching solution, a cell reaction based on the corrosion potential difference between both films does not occur. Incidentally, the molybdenum or titanium film g2 which constitutes a base (underlying layer) for the aluminum film g1 of the stacked structure film improves the adhesion of the aluminum film g1 to the transparent conductive film g3 which constitutes a base for the molybdenum or titanium film g2 in the case of the counter line CL, as well as the adhesion of the aluminum film g1 to the glass substrate SUB1 in the case of the gate line/electrode GL (GT).

In the fourth embodiment, since each of the counter line CL and the gate line/electrode GL (GT) is the above-described three-layer structure film, the transparent conductive film g3 which constitutes the base for the counter line CL does not need to be amorphous, and may also adopt crystalline ITO or the like.

According to the fourth embodiment, as in the case of the third embodiment, since the transparent conductive film g6 which constitutes the counter electrode CT is directly formed on the glass substrate (TFT substrate) SUB1, there is not a "pattern climb-over portion" in which a pattern climbs over an interconnection line, and therefore, a problem such as a disconnection caused by the pattern climb-over portion does not occur. Accordingly, it is possible to obtain a liquid crystal display device having high reliability.

The driving, structure and application examples of the liquid crystal display device according to the present invention to which any of the above-described embodiments is applied will be described below.

Figure 15:
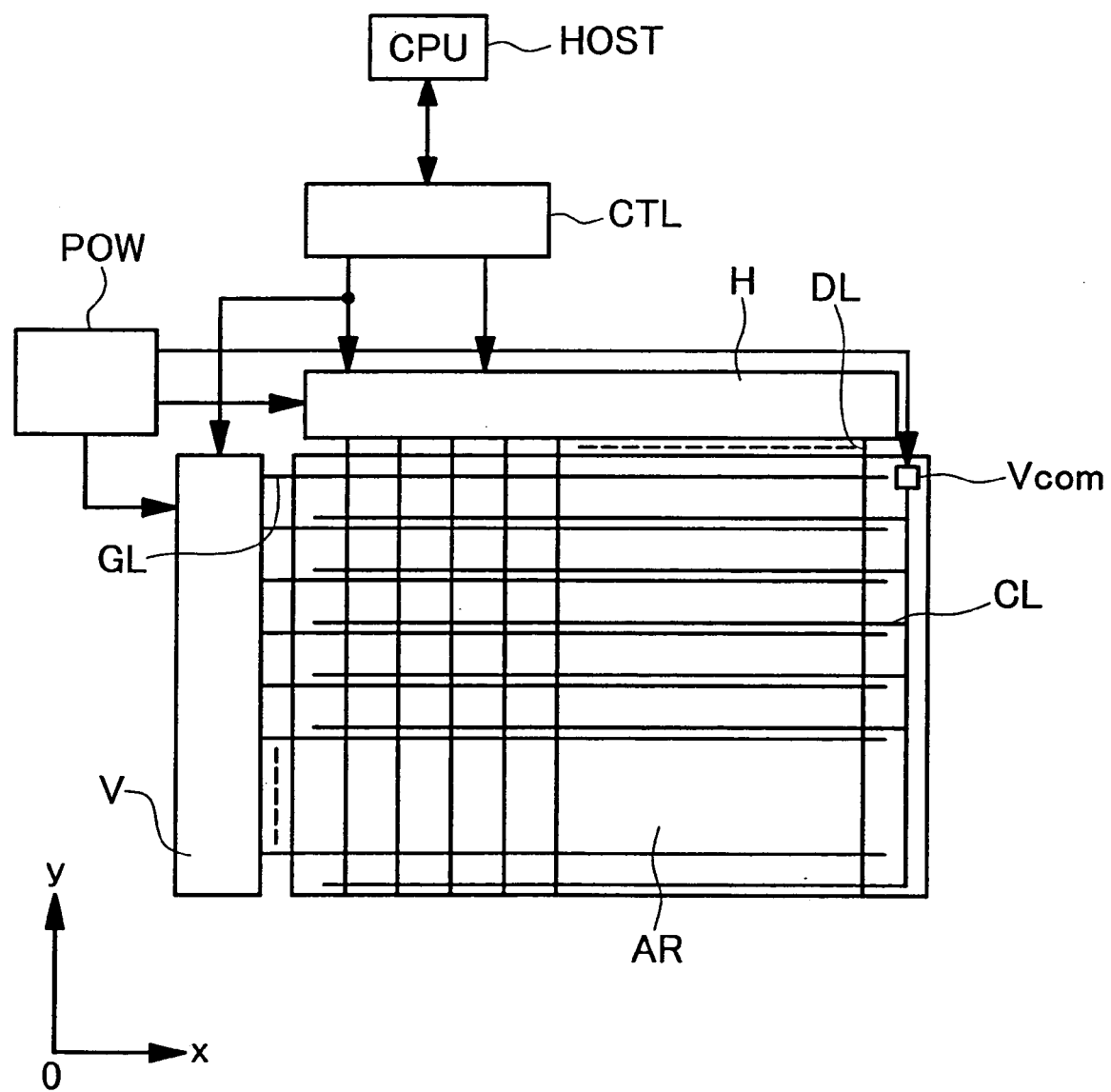
FIG. 15 is an explanatory view of the equivalent circuit of the liquid crystal display device according to the present invention.

FIG. 15 is an explanatory view of the equivalent circuit of the liquid crystal display device according to the present invention. As shown in FIG. 15, a liquid crystal panel which constitutes the liquid crystal display device has a display portion formed by an assembly of plural pixels arrayed in matrix form, and each of the pixels is constructed to be able to individually modulate and control transmitted light from a back light arranged at the back of the liquid crystal panel.

Gate lines GL, counter lines CL and drain lines DL are formed over an effective pixel area AR of an TFT substrate SUB1 which is one constituent element of the liquid crystal panel. The gate lines GL and the counter lines CL are disposed to be extended in the x direction (the row direction) of the effective pixel area AR and to be juxtaposed in the y direction (the column direction) of the same. The drain lines DL are disposed to be extended in the y direction and to be juxtaposed in the x direction. Each of the gate lines GL and the counter lines CL has a construction according to any of the above-described embodiments. A unit pixel is formed in each of the rectangular areas surrounded by the gate lines GL and the drain lines DL.

The liquid crystal display device is provided with a vertical scanning circuit V and a video signal driver circuit H as an external circuit of the liquid crystal panel. A scanning signal (voltage) is sequentially supplied to each of the plural gate lines GL by the vertical scanning circuit V, and in synchronism with that timing, a video signal (voltage) is supplied to the drain lines DL from the video signal driver circuit H.

Each of the vertical scanning circuit V and the video signal driving circuit H is supplied with electric power from a liquid crystal driving power source circuit POW, and picture (video) information from a host CPU such as a personal computer or a television receiver circuit is separated into display data and a control signal and inputted to the circuits V and H by a controller CTL.

Figure 16:
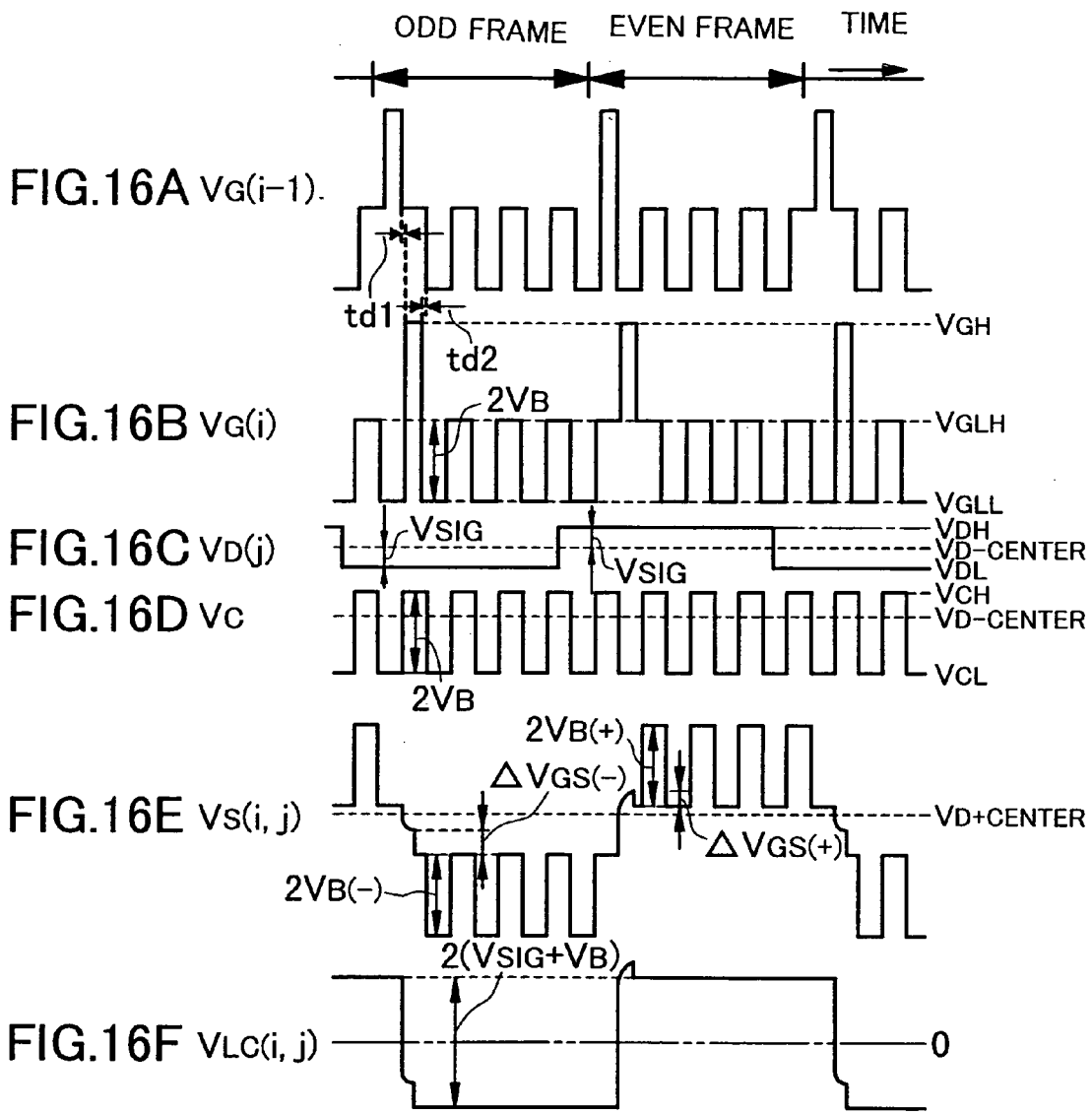
FIG. 16 is an explanatory view of one example of driving waveforms of a liquid crystal display device to which the present invention is applied.

FIG. 16 is an explanatory view of one example of driving waveforms of a liquid crystal display device to which the present invention is applied. In FIG. 16, a counter voltage to be applied to each counter electrode via the corresponding counter line is formed as an alternating current rectangular wave having two values $V_{CH}$ and $V_{CL}$, and the non-selection voltage of each scanning signal $V_G(i-1)$ and $V_G(i)$ is varied between two values $V_{CH}$ and $V_{CL}$ at intervals of one scanning period in synchronism with the counter voltage. The amplitude of the counter voltage and the amplitude of the non-selection voltage is made the same.

A picture (video) signal voltage is a voltage obtained by subtracting ½ of the amplitude of the counter voltage from a voltage to be applied to the liquid crystal layer.

The counter voltage may also be a direct current voltage, but by alternating the counter voltage, it is possible to decrease the maximum amplitude of the picture (video) signal voltage, whereby it is possible to use a low-breakdown-voltage type of video signal driver circuit (signal-side driver) H.

Figure 17:
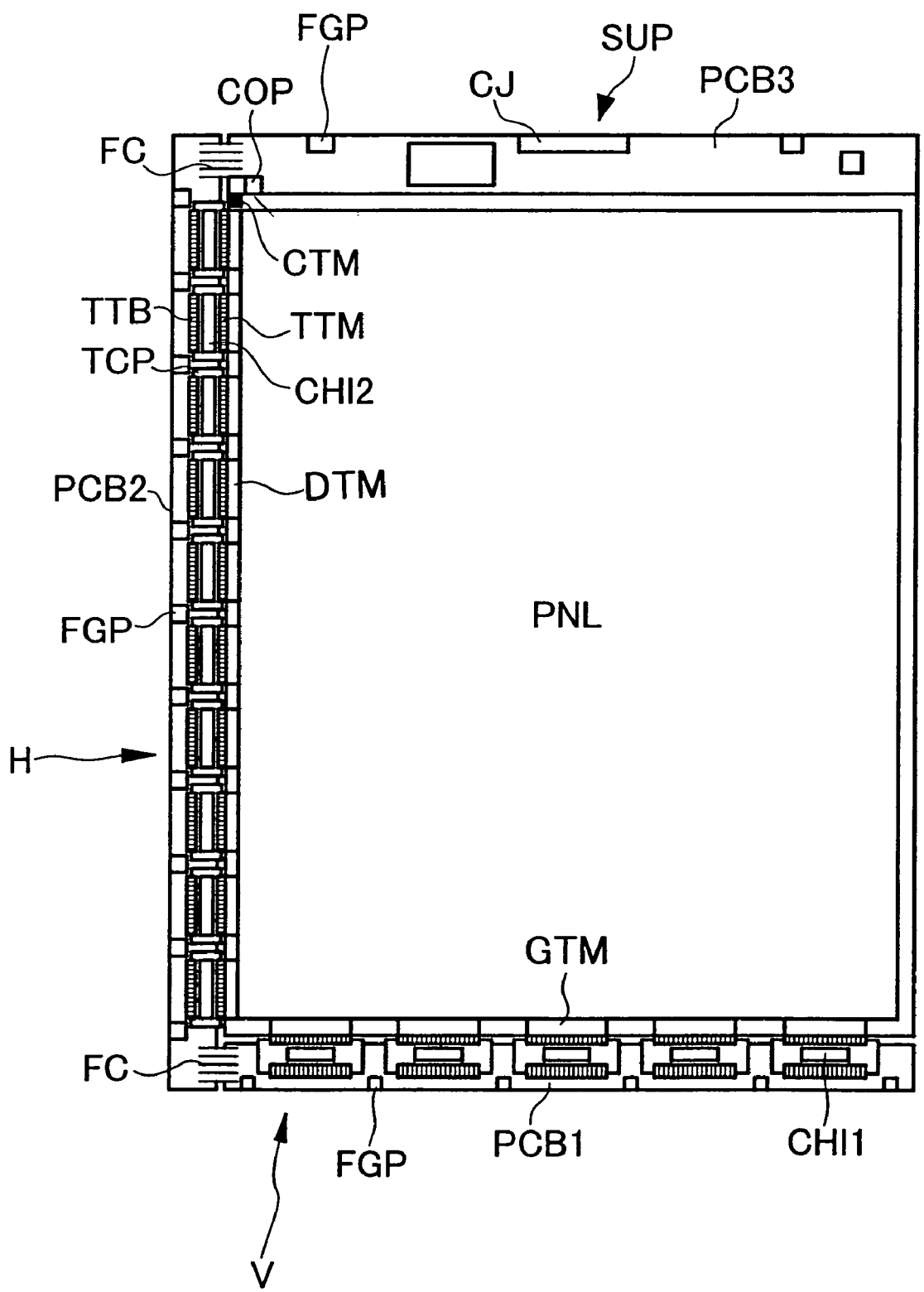
FIG. 17 is a plan view showing one example of the state in which an external circuit is mounted on the liquid crystal panel of a liquid crystal display device to which the present invention is applied.

FIG. 17 is a plan view showing one example of the state in which the external circuit is mounted on the liquid crystal panel of a liquid crystal display device to which the present invention is applied. Mounted on the peripheral portion of the liquid crystal panel PNL are a first driver circuit board PCB1 on which a vertical scanning circuit V is disposed, a second driver circuit board PCB2 on which a video signal driver circuit H is disposed, and a power supply circuit board PCB3. The first driver circuit board PCB1 and the second driver circuit board PCB2 are each made of a so-called flexible printed circuit board FPC.

The vertical scanning circuit V has plural driver IC chips CH11 mounted by a film carrier method (TCP method), and the output bumps of each of the driver IC chips CH11 are respectively connected to gate signal terminals GTM of the liquid crystal panel, while the input bumps of the same are respectively connected to terminals on the first driver circuit board PCB1.

Similarly, the video signal driving circuit H has plural driver IC chips CH12 mounted by a film carrier method (TCP method), and the output bumps of each of the driver IC chips CH12 are respectively connected to gate signal terminals DTM of the liquid crystal panel, while the input bumps of the same are respectively connected to terminals on the second driver circuit board PCB2.

The power supply circuit board PCB3 is connected to the video signal driver circuit H on the second driver circuit board PCB2 via a flat cable FC, and this video signal driver circuit H is connected to the vertical scanning circuit V on the first driver circuit board PCB1 via a flat cable FC.

Incidentally, the present invention is not limited to this type of liquid crystal display device, and can, of course, be applied to a so-called COG (Chip On Glass) scheme in which a semiconductor chip which constitutes each circuit is directly disposed on a TFT substrate SUB1 and the input/output bumps of the semiconductor chip are respectively connected to terminals (or interconnecting layers) formed on the TFT substrate SUB1.

Figure 18:
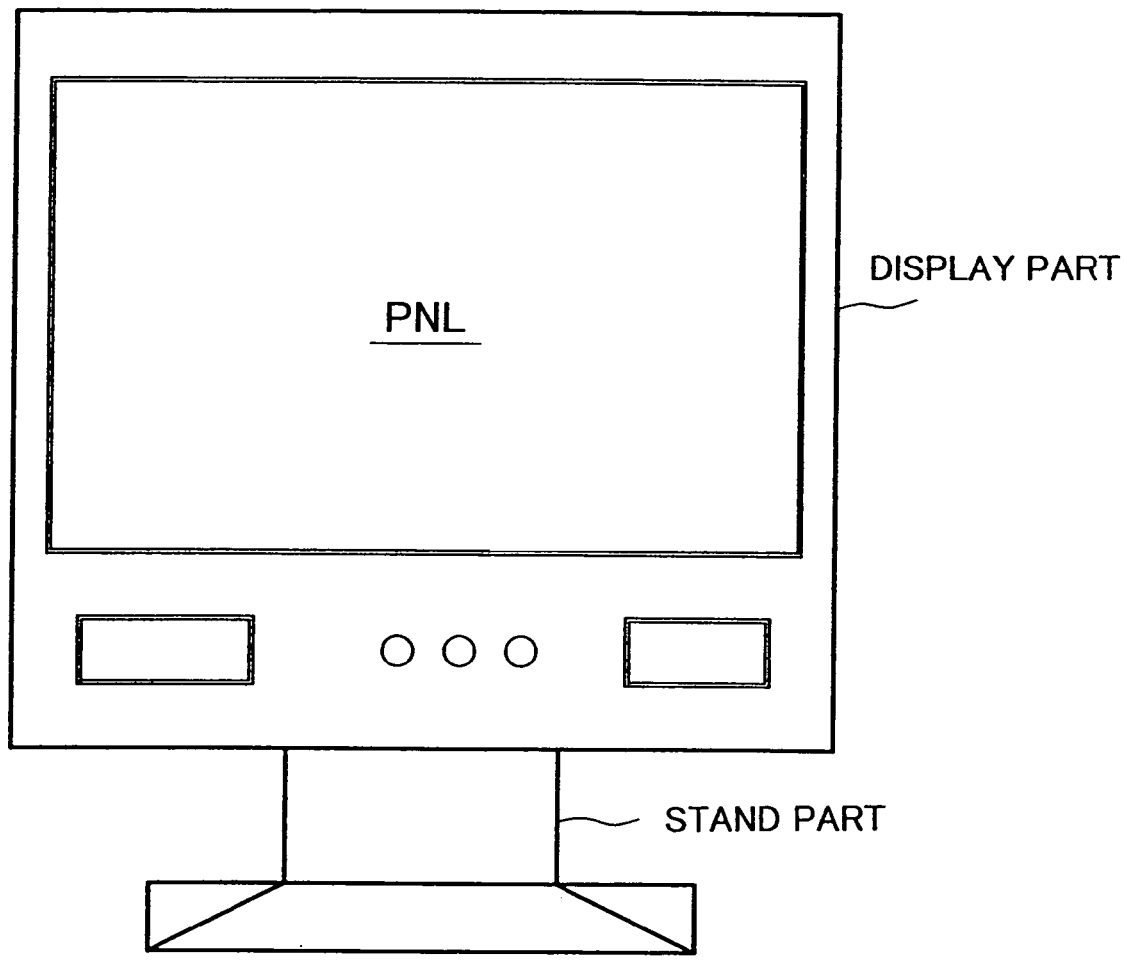
FIG. 18 is a front view showing one example of a display monitor to which the liquid crystal display device according to the present invention is applied.

FIG. 18 is a front view showing one example of a display monitor to which The liquid crystal display device according to the present invention is applied. This display monitor has a display part in which the liquid crystal display device according to any of the above-described embodiments of the present invention is disposed, and displays a picture on its liquid crystal panel PNL. The display part is supported by a stand part. This display monitor is not limited to a type to be connected to an external signal source which is not shown (a personal computer or a television receiver circuit), and the external signal source may also be built in the stand part or in the periphery thereof.

Figure 19:
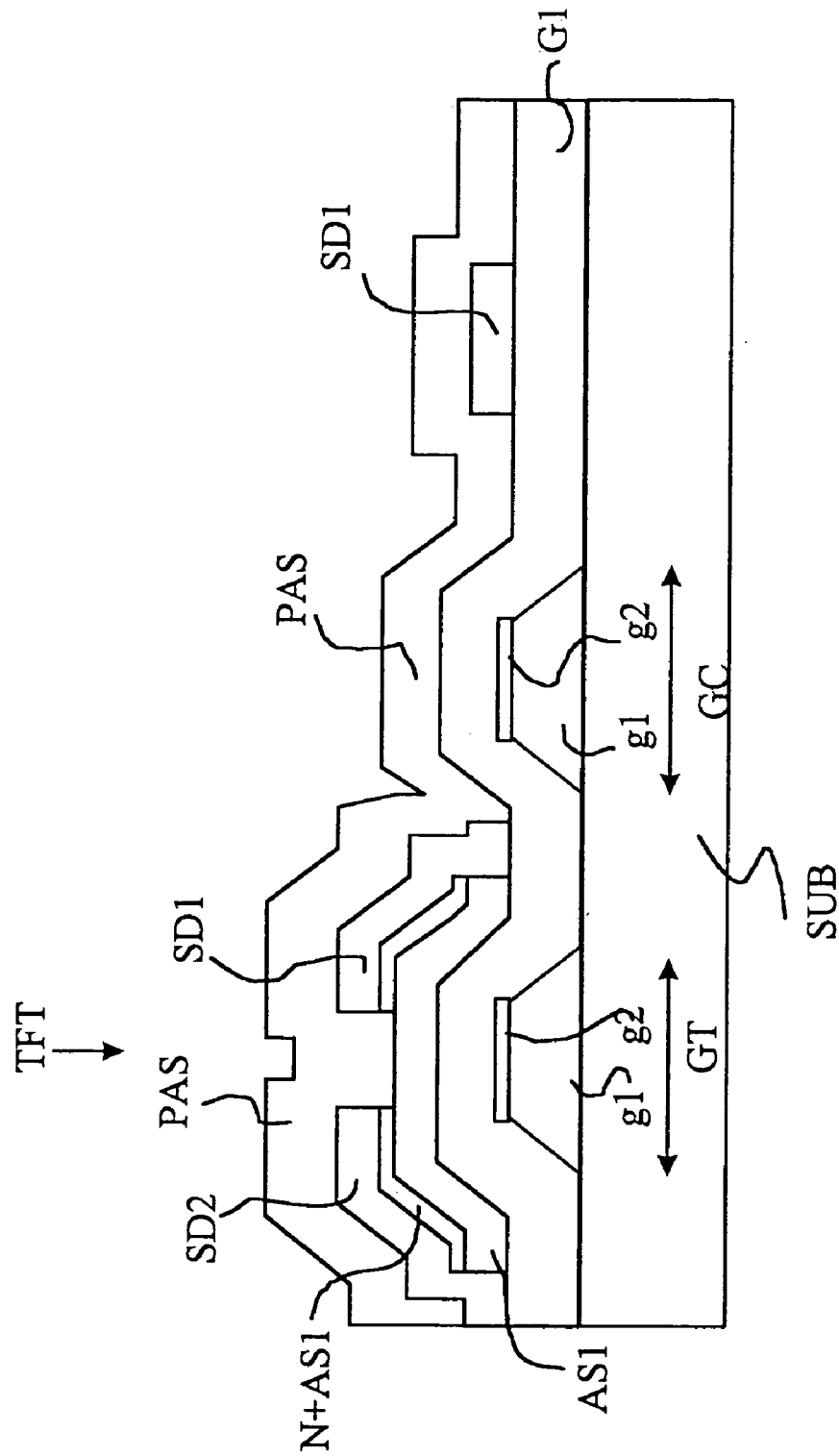
FIG. 19 is a diagrammatic cross-sectional view illustrating the construction of the essential portion of a fifth embodiment of the liquid crystal display device according to the present invention.
Figure 20:
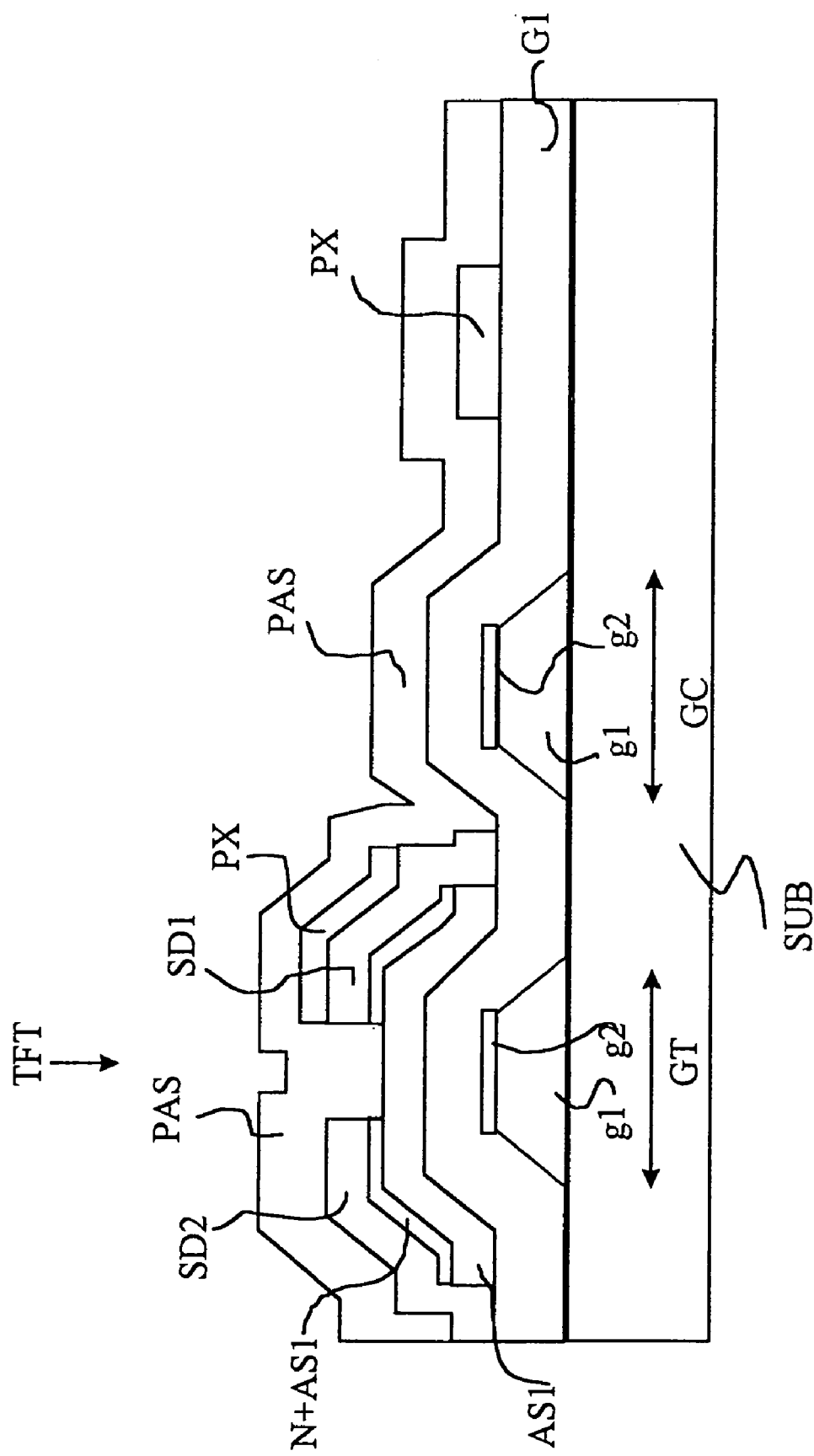
FIG. 20 is a diagrammatic cross-sectional view illustrating the construction of the another example of a fifth embodiment of the liquid crystal display device according to the present invention.

FIG. 19 is a diagrammatic cross-sectional view illustrating the construction of the essential portion of a fifth embodiment of the liquid crystal display device according to the present invention, FIG. 19 shows an example that this patent is applied on IPS devices. The source comb-teeth like electrodes and the counter comb-teeth like electrodes are fabricated with metal. In this case, the amorphous transparent conductive film is used as lead films, which is not illustrated in FIG. 19. As an another example, the fabrication of source comb-teeth like electrodes with the transparent film makes it possible to increase transmissivity by decreasing shield area. This example is shown in FIG. 20.

FIG. 21 is a diagrammatic cross-sectional view illustrating the construction of the essential portion of a sixth embodiment of the liquid crystal display device according to the present invention, FIG. 21 shows an example that the counter comb-teeth like electrodes is fabricated with the amorphous transparent conductive film. The counter (common) electrodes PX are fabricated on the passivation layer made of acrylic resin OP. The gate electrodes are formed with the layered structure which consists of refractory metal and aluminum film. The amorphous ITO or IZO film are adopted as the counter electrodes so as not to damage gate aluminum films on development and wet etching process of the transparent films. When a network of the counter electrode are fabricated on both scanning and data bus lines, the aperture ratio can be improved because of no metal counter electrodes in the pixels. In this case, the passivation layer consists of layered CVD deposited SiN film and the acrylic resin film in order to decrease inter-wiring capacitance between the counter electrodes and the gate and drain SD2 bus lines.

When the electric resistance of the transparent counter electrodes is too high, common bus lines running parallel to scanning line are fabricated on the same layer of gate electrodes. In this case, the transparent counter electrodes is connected to the metal common bus lines in each pixel at the through-holes, which is formed simultaneously in the layered passivation films.

According to the present invention, it is possible to obtain a highly reliable and bright picture display. It is characteristic that amorphous transparent film is etched after Al gate interconnects fabrication. On the other hand, the transparent electrodes may be formed on different layers from the gate electrodes on the other device structure. This patent is effective on the case of the fabrication of transparent electrodes on Al interconnects. According to the present invention, from among the various kinds of interconnection lines such as gate lines, drain lines and counter lines that are required to constitute a liquid crystal display device, at least interconnection lines to be disposed as the same layer as the gate lines are formed of aluminum or a material which essentially contains aluminum, and then the counter electrodes and pixel electrodes which constitute pixels are formed by using an amorphous transparent conductive film. Representative aspects of the present invention will be described below.

(1) An insulative substrate has an interconnection line which a stacked film in which an aluminum layer or an alloy layer which essentially contains aluminum is covered with a high-melting point metal layer is covered with a transparent conductive film.

(2) The insulative substrate has thin film transistors, gate lines/electrodes, drain lines/electrodes, and counter lines/ electrodes, and at least one kind of line/electrode selected from among the lines/electrodes is made of a stacked structure film covered with a transparent conductive film, the stacked structure film including an aluminum layer or an alloy layer essentially containing aluminum, and a high-melting point metal layer which covers the aluminum layer or the alloy layer.

(3) A liquid crystal display device includes:
a thin film transistor having a gate line/electrode, a drain line/electrode and a source electrode on either one of a pair of substrates disposed in opposition to each other with a liquid crystal interposed therebetween;
a counter line arranged in or near a pixel area surrounded by two gate lines and two drain lines, and a counter electrode connected to the counter line and formed in a solid manner approximately over the whole of the pixel area; and
a pixel electrode having an approximately comb-like shape connected to the source electrode and formed over the counter electrode with an insulation layer interposed therebetween,
each of the gate lines/electrodes and/or the drain lines/ electrodes and the counter lines being formed of a stacked structure film including an aluminum layer or an alloy layer essentially containing aluminum and a high-melting point metal layer which covers the aluminum layer or the alloy layer, the counter electrode being formed as a transparent conductive film formed in a solid manner approximately over the whole of the pixel area.

(4) A liquid crystal display device includes:
a thin film transistor having a gate line/electrode, a drain line/electrode and a source electrode on either one of a pair of substrates disposed in opposition to each other with a liquid crystal interposed therebetween;
a counter line arranged in or near a pixel area surrounded by two gate lines and two drain lines, and a counter electrode connected to the counter line; and
a pixel electrode having an approximately comb-like shape connected to the source electrode and formed over the counter electrode with an insulation layer interposed therebetween,
each of the gate lines/electrodes and/or the drain lines/ electrodes and the counter lines being formed of a stacked structure film including an aluminum layer or an alloy layer essentially containing aluminum and a high-melting point metal layer which covers the aluminum layer or the alloy layer, the counter electrode being formed as a transparent conductive film conductively connected to the high-melting point metal layer.

(5) A liquid crystal display device includes:
a thin film transistor having a gate line/electrode, a drain line/electrode and a source electrode on either one of a pair of substrates disposed in opposition to each other with a liquid crystal interposed therebetween;
a counter line arranged in or near a pixel area surrounded by two gate lines and two drain lines, and a counter electrode connected to the counter line;
a pixel electrode having an approximately comb-like shape connected to the source electrode and formed over the counter electrode with an insulation layer interposed therebetween,
each of the gate line/electrode and the drain line/electrode having an alumina layer over an aluminum layer or an alloy layer essentially containing aluminum, the counter line having an alumina layer over an aluminum layer or an alloy layer essentially containing aluminum and a high-melting point metal layer formed to extend through the alumina layer from a surface side of a portion of the alumina layer to the aluminum layer or an alloy layer essentially containing aluminum, the counter electrode being formed as a transparent conductive film conductively connected to the high-melting point metal layer.

(6) The alloy which essentially contains aluminum is an aluminum-rare earth alloy in which an rare earth element is added to aluminum, and any one or two or more of neodymium Nd, yttrium Y, lanthanum La and samarium Sm are used as the rare earth element.

(7) The high-melting point metal is any one or two or more of molybdenum Mo, chromium Cr, tungsten W and titanium Ti.

(8) The transparent conductive film is any one of amorphous ITO (Indium Tin Oxide), amorphous IZO (Indium Zinc Oxide) and amorphous IGO (Indium Germanium Oxide).

(9) Each of the gate line and the counter line uses a stacked film in which the upper surface of an aluminum layer is covered with a high-melting point metal such as molybdenum Mo or titanium Ti or with an alloy of the high-melting point metal, and a plane pixel electrode made of an amorphous transparent conductive film is formed in the same layer as the gate line and the counter line, and a comb-teeth like electrode made of an amorphous transparent conductive film is formed as the counter electrode in the same layer as the source and drain lines or over an insulating film (PAS film).

The film of the high-melting point metal such as molybdenum Mo or titanium Ti which overlies the portions of the gate line and the counter line that are in contact with the counter electrode made of a transparent electrode and which lies in a portion except gate terminals and counter terminals is removed by etching, and the resultant exposed aluminum surface is oxidized to form an alumina film.

(10) The gate line is formed of an aluminum/neodymium (Al/Nd) alloy which overlies a high-melting point metal such as molybdenum Mo, and an amorphous transparent conductive film is formed as a layer which underlies the gate line.

(11) On the supposition that polycrystalline ITO is used, the polycrystalline ITO is formed as the lowermost layer, and molybdenum, aluminum and molybdenum (Mo/Al/Mo) are stacked on the polycrystalline ITO as the gate line and the counter line.

As is apparent from the foregoing description, according to the liquid crystal display device of the present invention, from among the various kinds of interconnection lines such as gate lines, drain lines and counter lines that are required to constitute the liquid crystal display device, at least interconnection lines to be disposed as the same layer as the gate lines are formed of aluminum or a material which essentially contains aluminum, and then the counter electrodes and pixel electrodes which constitute pixels are formed by using an amorphous transparent conductive film. Accordingly, it is possible to provide a liquid crystal display device capable of displaying a highly reliable and bright picture.

What is claimed is:

1. A liquid crystal display device comprising:
   a pair of substrates;
   a liquid crystal layer interposed between said pair of substrates;
   drain lines and gate lines formed on one of said pair of substrates and crossing each other in a matrix form, each crossing one of said drain lines and gate lines defining a pixel;
   a switching element associated with and disposed relative to each pixel;
   a sheet-like counter electrode comprising a transparent conductive film arranged at each pixel;
   a counter voltage line formed on said counter electrode, a first insulating layer formed on said counter electrode and said counter voltage line;
   a second insulating layer formed on said first insulating layer; and
   a pixel electrode comprising a transparent conductive film that is electrically connected to said switching element,
   wherein said gate lines and said counter voltage line including a multilayered structure comprising a first molybdenum layer, followed by an aluminum layer or an alloy layer comprising essentially of aluminum, followed by a second molybdenum layer.

2. The liquid crystal display device according to claim 1, wherein said counter voltage line intersects said drain lines through said first insulating layer.

3. The liquid crystal display device according to claim 1, wherein at least one of said first molybdenum layer and said second molybdenum layer comprises an alloy layer comprising essentially of molybdenum.

4. The liquid crystal display device according to claim 1, wherein said pixel electrode has an approximately linear-shaped structure, zigzag-shaped structure, slit shape structure, or comb-shaped structure.

5. The liquid crystal display device according to claim 4, wherein said pixel electrode extends in the same direction as said gate lines.

6. The liquid crystal display device according to claim 1, wherein said transparent conductive film of said pixel electrode and of said counter electrode each includes one of ITO, IZO, or IGO.

7. The liquid crystal display device according to claim 6 wherein said transparent conductive film is a polycrystalline.

8. The liquid crystal display device according to claim 6 wherein said transparent conductive film is amorphous.

9. The liquid crystal display device according to claim 6, wherein said transparent conductive film of said pixel electrode and of said counter electrode are different materials.

10. The liquid crystal display device according to claim 9, wherein said transparent conductive film is a polycrystalline.

11. The liquid crystal display device according to claim 9, wherein said transparent conductive film is amorphous.

12. The liquid crystal display device according to claim 1, wherein said switching element is a thin film transistor and said first insulating layer is a gate insulating layer of said thin film transistor.

13. The liquid crystal display device according to claim 1, wherein said counter voltage line extends in the same direction as said gate lines.

* * * * *